US008220575B2

(12) United States Patent
Dial

(10) Patent No.: US 8,220,575 B2
(45) Date of Patent: Jul. 17, 2012

(54) ELECTRIC VEHICLE WITH SWITCHED RELUCTANCE MOTOR POWER PLANT

(75) Inventor: Daniel Christopher Dial, Shelton, WA (US)

(73) Assignee: Everette Energy, LLC, Dallas, TX (US)

( * ) Notice: Subject to any disclaimer, the term of this patent is extended or adjusted under 35 U.S.C. 154(b) by 0 days.

(21) Appl. No.: 13/196,098

(22) Filed: Aug. 2, 2011

(65) Prior Publication Data

US 2012/0056575 A1    Mar. 8, 2012

Related U.S. Application Data

(63) Continuation of application No. 12/874,936, filed on Sep. 2, 2010, now Pat. No. 8,006,789.

(51) Int. Cl.
*B60K 1/00* (2006.01)
*H02K 1/06* (2006.01)
(52) U.S. Cl. ............ 180/65.51; 180/65.1; 903/906; 310/112; 310/216.025
(58) Field of Classification Search .......... 180/65.1, 180/65.21, 65.285, 65.51, 65.6; 903/906; 318/139, 701; 310/122, 162, 166, 216.025, 310/216.026, 216.027
See application file for complete search history.

(56) References Cited

U.S. PATENT DOCUMENTS

| | | | |
|---|---|---|---|
| 4,584,513 A | 4/1986 | Freise et al. | |
| 4,661,756 A | 4/1987 | Murphy et al. | |
| 4,684,867 A | 8/1987 | Miller et al. | |
| 4,698,537 A | 10/1987 | Byrne et al. | |

(Continued)

FOREIGN PATENT DOCUMENTS

EP    0814558 A2    12/1997
(Continued)

OTHER PUBLICATIONS

Amanda Martin Staley, "Design and Implementation of a Novel Single-Phase Switched Reluctance Motor Drive System," Thesis submitted to the Faculty of the Virginia Polytechnic Institute and State University in partial fulfillment of the requirements for the degree of Master of Science in Eelctrical Engineeering, Aug. 21, 2001, Blacksurg, VA, Copyright 2001, Amanda Martin Staley, total of 88 pages.

(Continued)

*Primary Examiner* — John Walters
(74) *Attorney, Agent, or Firm* — Gardere Wynne Sewell LLP; Andre M. Szuwalski

(57) ABSTRACT

A reluctance machine includes a stator and a rotor. The stator and rotor have a same number of poles. The rotor is configured to rotate about an axis of rotation. Each stator pole is formed of a primary stator pole and an auxiliary stator pole. The auxiliary stator pole is axially aligned with the primary stator pole in the direction of the axis of rotation. Each rotor pole has a length extending in the direction of the axis of rotation sufficient to at least partially cover the primary stator pole and axially aligned auxiliary stator pole. The primary stator poles are actuated with an alternating magnetic field orientation, and the auxiliary stator poles are also actuated with an alternating magnetic field orientation. The field orientations for the primary and auxiliary stator poles are, however, opposite each other such that a primary stator pole its axially aligned auxiliary stator pole have opposite magnetic field orientations.

20 Claims, 16 Drawing Sheets

U.S. PATENT DOCUMENTS

| | | | |
|---|---|---|---|
| 4,737,674 | A | 4/1988 | Miyao |
| 4,804,873 | A | 2/1989 | Shiraki et al. |
| 4,995,159 | A | 2/1991 | Hancock et al. |
| 5,811,905 | A | 9/1998 | Tang |
| 6,051,942 | A | 4/2000 | French |
| 6,075,302 | A * | 6/2000 | McCleer .................... 310/166 |
| 6,578,649 | B1 * | 6/2003 | Shimasaki et al. ....... 180/65.225 |
| 6,700,348 | B2 | 3/2004 | Lim |
| 7,081,725 | B2 * | 7/2006 | Seely et al. .................. 318/139 |
| 7,271,564 | B2 | 9/2007 | Ramu |
| 7,291,945 | B2 * | 11/2007 | Nashiki ..................... 310/49.37 |
| 7,427,845 | B2 | 9/2008 | Burse |
| 7,583,000 | B2 * | 9/2009 | Durham et al. ............. 310/180 |
| 7,633,172 | B2 * | 12/2009 | Kalev et al. .................. 290/1 R |
| 7,781,931 | B2 * | 8/2010 | Ishikawa et al. ............. 310/112 |
| 2008/0197793 | A1 | 8/2008 | Randall |
| 2008/0234096 | A1 * | 9/2008 | Joshi et al. ........................ 477/3 |
| 2008/0272664 | A1 | 11/2008 | Flynn |
| 2008/0278010 | A1 | 11/2008 | Ishikawa et al. |
| 2009/0021192 | A1 | 1/2009 | Kudligi |
| 2009/0072676 | A1 | 3/2009 | Johnson et al. |
| 2009/0108712 | A1 | 4/2009 | Holtzapple et al. |

FOREIGN PATENT DOCUMENTS

| | | |
|---|---|---|
| JP | 10098861 A | 4/1998 |
| JP | 2000062471 A | 2/2000 |
| KR | 10-2006-0032814 | 4/2006 |

OTHER PUBLICATIONS

C. C. Chan, MSc, PhD, CEng, MIEE, "Single-Phase Switched Reluctance Motors," IEE Proceedings, vol. 134, Pt. B, No. 1, Jan. 1987, pp. 53-56.

Dr. A. Stassis, Higher Technical Institute, Dr. A. M. Michaelides, Electricity Authority Cyprus, "The Design of Low Vibration Doubly Salient Motors," Electric Machines and Power Systems, 27:967-981, 1999, Copyright 1999 Taylor & Francis, Inc., 0731-356X.

E. Afjei, A Seyadatan, and H. Torkaman, Department of Electrical Engineering, Shahid Beheshti University, GC Tehran, Iran, "A New Two Phase Bidirectional Hybrid Switched Reluctance Motor/Field-Assisted Generator," Journal of Applied Sciences 9 (4): 765-770, 2009, ISSN 1812-5654, Copyright 2009 Asian Network for Scientific Information.

Ferhat Daldaban, Nurettin Ustkoyuncu, "Multi-Layer Switched Reluctance Motor to Reduce Torque Ripple," Science Direct, Energy Conversion and Management 49 (2008) 974-979.

J. C. Compter, Philips Research Laboratories, Eindhoven, The Netherlands, "Microprocessor-Controlled Single-Phase Reluctance Motor," Proceedings of the Conference on Drives/Motors/Controls 84, Oct. 24-26, 1984, Brighton, pp. 64-68.

J. D. Lewis, H. R. Bolton, N. W. Phillips, Cardiff School of Engineering, University of Cardiff, Wales, UK, "Performance Enhancement of Single and Two Phase SR Drives Using a Capacitor Boost Circuit," epe '95, 6th European Conference on Power Electronics and Applications, Sep. 19-21, 1995, Sevilla, Spain, published by EPE Association c/o VUB-TW, pp. 3.229-3.232.

Jawad Faiz, B. Rezaeealam, and P. Pillay, "Adaptive Performance Improvement of Switched Reluctance Motor With Two-Phase Excitation," European Transactions on Electrical Power 2006: 16:1-13, published online Apr. 11, 2005 in Wiley InterScience (www.interscience.wiley.com). DOI: 10.1002/etep.61.

M. M. Mahmoud, J. E. Fletcher, B. W. Williams, School of Engineering and Physical Sciences, Heriot-Watt University, Riccarton, Edinburgh, Scotland, UK, "Evaluation of Rotor Conducting Screens on the Single-Phase Switched Reluctance Machine," Electric Power Components and Systems, 34:173-189, 2006, Copyright Taylor & Francis, LLC, ISSN: 1532-5008 print/1532-5016 online; DOI: 10.1080/15325000500244674.

Mi-Ching Tsai, Chien-Chin Huang, Zheng-Yi Huang, "A New Two-Phase Homopolar Switched Reluctance Motor for Electric Vehicle Applications," Science Direct, Journal of Magnetism and Magnetic Materials 267 (2003) 173-181.

Michael T. Direnzo "Switched Reluctance Motor Control—Basic Operation and Example Using the TMS320F240," Digital Signal Processing Solutions, Application Report SPRA420A—Feb. 2000, Copyright 2000, Texas Instruments Incorporated.

Patrick C. K. Luk, Department of Aerospace, Power and Sensors, Cranfield University, Shrivenham, UK, and Ken P. Jinupun, Department of Aerospace, Power and Sensors, Cranfield University, Shrivenham, UK, "Direct Work Control for a Three-Stack Switched Reluctance Motor," Copyright 2005, IEEE, pp. 2462-2466.

S. Chan, H. R. Bolton, "Performance Enhancement of Single-Phase Switched-Reluctance Motor by DC Link Voltage Boosting," IEE Proceedings-B, vol. 140, No. 5, Sep. 1991, pp. 316-322.

Sang-Hun Lee, Feel-Soon Kang, Sung-Jun Park, Su Eog Cho, Man Hyung Lee, "Single-Stage Power-Factor-Corrected Converter for Switched Reluctance Motor Drive," Science Direct, Electric Power Systems Research 76 (2006) 534-540.

Tadashi Sawata, Associated Member, IEEE, Philip C. Kjaer, Member, IEEE, Calum Cossar, T. J. E. Miller, Fellow, IEEE, and Yoichi Hayashi, "Fault-Tolerant Operation of Single-Phase SR Generators," IEEE Transactions on Industry Applications, vol. 35, No. 4, Jul./Aug. 1999, pp. 774-781.

Yoichi Hayashi and the Miller, "Single-Phase Multi-Pole SRM for Solar-Powered Vehicle," Proceedings of 1995 International Power Electronics Conference, IPEC-Yokohama '95, Apr. 3-7, 1995, Pacific Convention Plaza, Yokohama, Japan, sponsored by The Institute of Electrical Engineers of Japan, pp. 575-579.

PCT Search Report and Written Opinion for PCT/US2011/046275 mailed Mar. 14, 2012 (12 pages).

* cited by examiner

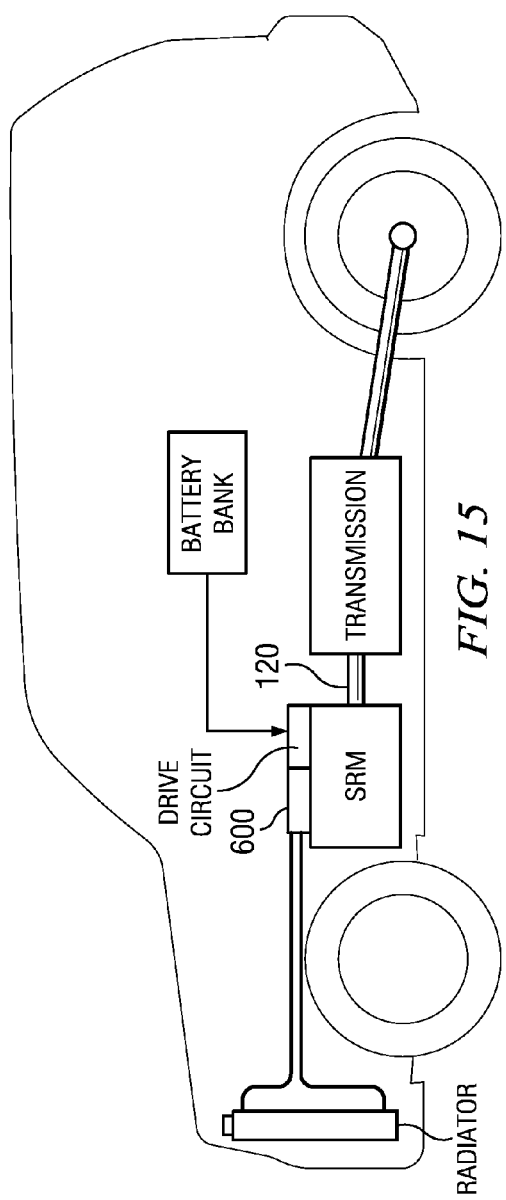
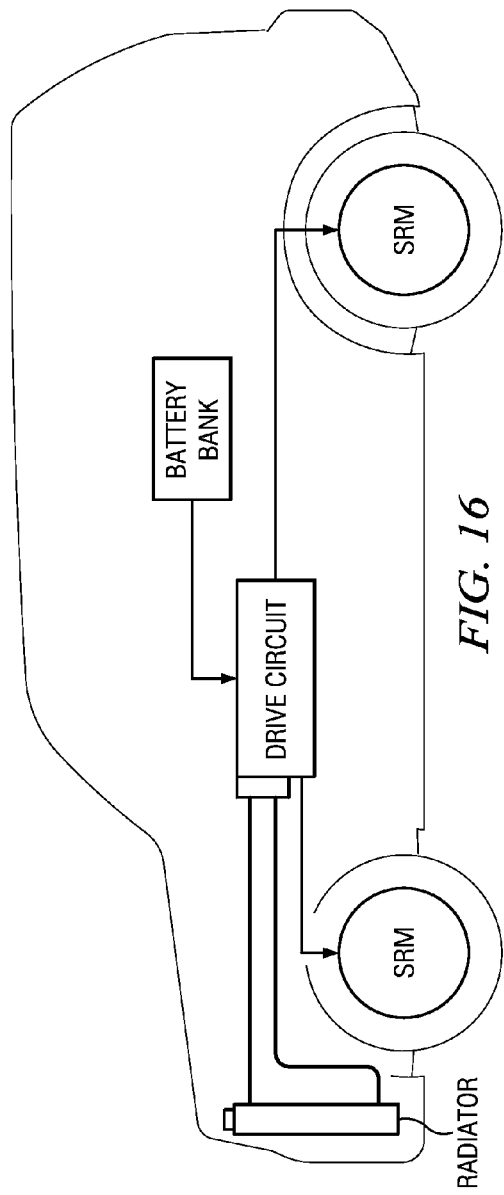

ELECTRIC VEHICLE WITH SWITCHED RELUCTANCE MOTOR POWER PLANT

CROSS REFERENCE TO RELATED APPLICATIONS

This application is a continuation of U.S. application patent Ser. No. 12/874,936 filed Sep. 9, 2010, now U.S. Pat. No. 8,006,789, the disclosure of which is hereby incorporated by reference.

This application is related to U.S. application patent Ser. No. 12/874,562 filed Sep. 9, 2010, the disclosure of which is hereby incorporated by reference.

BACKGROUND

1. Technical Field

The present invention relates generally to electric vehicles and, in particular, to an electric vehicle using a switched reluctance motor as a power plant.

2. Description of Related Art

With the increase in gasoline prices, and concerns over global warming, there is a significant interest in electric vehicles. While a number of different types of electric motors have been considered for use in electric vehicle applications, consideration has recently turned to the potential use of switched reluctance motors as the power plant for an electric vehicle.

Reluctance motors are well known in the art. These machines operate on the tendency of the machine's rotor to move to a position where the reluctance with respect to the stator is minimized (in other words, where the inductance is maximized). This position of minimized reluctance occurs where the rotor pole is aligned with an energized stator pole. When operated as a motor, energizing the stator pole generates a magnetic field attracting the rotor pole towards the stator pole. This magnetic attraction produces a torque causing the rotor to rotate and move towards the minimized reluctance position.

Both single-phase and multi-phase switched reluctance motors have been considered for electric vehicle applications. The present disclosure focuses on single-phase machines.

Reference is now made to FIGS. 1A and 1B which illustrate the general configuration and operation of a simple single phase switched reluctance motor of the 6/6 topology. The reference to "6/6" indicates that the machine has six rotor poles and six stator poles. The reference to "single-phase" indicates that there is only one stator energizing phase, and thus each of the six poles on the stator are energized simultaneously.

The stator 10 includes six poles 12. The rotor 18 is mounted to a shaft 20, and the shaft is supported by a housing and bearings (not shown) that allow for rotational movement of the rotor relative to the stator 10. The rotor 18 also includes six poles 22. The stator poles 12 and rotor poles 22 are salient poles, as is known in the art.

Each stator pole 12 is wound with a winding 14. The windings 14 for the six stator poles 12 are electrically connected in parallel and current is supplied thereto from a switched power supply 16. The winding direction for each stator pole winding 14 is indicated using an "×" and "●" nomenclature, where "×" indicates movement of charge into the page, and "●" indicates movement of charge out of the page. So, it will be noted with the windings 14 oriented as illustrated in FIGS. 1A and 1B, the magnetic field orientation of the stator poles when actuated alternates /N-S-N-S-N-S/ with respect to each stator pole around the circumference of the stator 10.

The magnetic flux paths 17 are shown with respect to the actuated stator poles 12. These paths flow from a first stator pole, cross the air gap to a first rotor pole, and flow from the first rotor pole through the web of the rotor to a second rotor pole adjacent the first rotor pole, cross the air gap to a second stator pole adjacent to the first stator pole, and flow from the second stator pole back to the first stator pole.

FIG. 1A shows the approximate angular orientation of the rotor 18 when a switched power supply 16 that is coupled to the windings 14 of the stator 12 poles may be actuated. Current is supplied to the stator pole windings 14 so as to simultaneously energize the six poles 12 of the stator 10. The six rotor poles 22 are attracted to the energized stator poles 12, producing a torque 24 on the shaft 20 and causing the rotor to rotate. The rotor poles 22 move towards the energized stator poles 12 in an effort to minimize the reluctance.

As the rotor poles 22 move towards the position of minimized reluctance (i.e., when the rotor pole 22 is aligned with the stator pole 12) as shown in FIG. 1B, the switched power supply 16 is de-actuated. Angular momentum is preserved and the rotor continues to rotate such that the rotor pole 22 passes by the de-energized stator pole 12. After a delay period which allows the rotor pole 22 to move sufficiently away from the stator pole 12 (i.e., move closer to the next stator pole), the switched power supply 16 is actuated again (see, FIG. 1A), and the process repeats.

It will be noted that proper operation of the motor is dependent on the timing of switched power supply 16 actuation and thus the actuation of the stator poles. That timing of actuation is driven by the angular position of the rotor poles relative to the stator poles. Thus, the motor further includes an angular position sensor 26 coupled to the shaft 20 to detect the angular position of the rotor poles relative to the stator poles. The angular position information output from the angular position sensor 26 is supplied to the switched power supply 16 to assist in controlling the timing of switched power supply 16 actuation of the stator poles 12.

Single-phase motors are believed to have limited use as an electric vehicle power plant because of concerns with, among other issues, start-up, limited maximum output torque, variations in output torque (known as torque ripple), energy and heat dissipation, and noise. However, single-phase motors advantageously need a relatively more simple control system than is used in multi-phase reluctance motors, and are preferred over multi-phase motors in many applications for this reason. There is accordingly a need in the art for an improved single-phase switched reluctance motor which addresses the limitations and concerns of prior art single-phase configurations while maintaining the advantages of simple control. There is further a need for a single-phase configuration which can support sufficient torque output in an electric vehicle application.

SUMMARY

In an embodiment, an electric vehicle comprises: at least one drive wheel and a power plant configured to supply torque for causing rotation of the at least one drive wheel. The power plant comprises a switched reluctance motor, comprising: a stator having a plurality of stator poles; and a rotor having a plurality of rotor poles, the rotor being coupled to the at least one drive wheel. Each stator pole comprises: a primary stator pole having a primary stator winding; and an auxiliary stator pole having an auxiliary stator winding. The motor further comprises a circuit configured to actuate the primary stator pole and auxiliary stator pole in a stator energizing phase comprising a primary energizing phase in which a first current is switched to flow from a power supply node through the primary stator winding and an auxiliary energizing phase in which a second current generated by the primary stator winding is switched to flow from the primary stator winding to the auxiliary stator winding.

In an embodiment, an electric vehicle comprises: at least one drive wheel; and a power plant configured to supply torque for causing rotation of the at least one drive wheel. The power plant comprises a switched reluctance motor, comprising: a stator having a plurality of stator poles; and a rotor having a plurality of rotor poles, the rotor being coupled to the at least one drive wheel;. Each stator pole comprises: a primary stator pole having a primary stator winding coupled between a first power supply node and an intermediate node; and an auxiliary stator pole having an auxiliary stator winding also coupled between the first power supply node and the intermediate node. The primary stator pole and the auxiliary stator pole are axially aligned with each other in the direction of an axis of rotation of the rotor. The motor further comprises a circuit configured to actuate the primary stator pole and auxiliary stator pole comprising a switching transistor having a conduction terminal coupled between the intermediate node and a second power supply node to actuate all of the stator poles in a single stator energizing phase.

In an embodiment, an electric vehicle comprises: at least one drive wheel; and a power plant configured to supply torque for causing rotation of the at least one drive wheel. The power plant comprises a switched reluctance motor, comprising: a single energizing phase stator having a plurality of stator poles; and a rotor having a plurality of rotor poles, the rotor being coupled to the at least one drive wheel. Each stator pole comprises: a primary stator pole having a primary stator winding; and an auxiliary stator pole having an auxiliary stator winding, wherein the primary stator pole and the auxiliary stator pole are aligned with each other in the direction of an axis of rotation of the rotor to apply a magnetic attraction force to the rotor during said single stator energizing phase. Each rotor pole has a length extending in the direction of an axis of rotation for said rotor sufficient to at least partially cover both the primary stator pole and the axially aligned auxiliary stator pole during the single stator energizing phase. The motor further comprises a circuit configured to simultaneously actuate the plurality of stator poles in the single energizing phase, wherein during the single stator energizing phase the primary stator windings of the primary stator poles are initially actuated followed by actuation of the auxiliary stator windings of the auxiliary stator poles.

The vehicle may comprise two or more drive wheels and the switched reluctance motor power plant is configured to supply torque for causing rotation of said drive wheels.

The vehicle may further comprise a transmission coupled between the switched reluctance motor power plant and the at drive wheel.

In an embodiment, the power plant may comprise a first power plant supplying first torque for actuating a first drive wheel and a second power plant supplying second torque for actuating a second drive wheel, each one of the first and second power plants comprising a switched reluctance motor.

The vehicle may further comprise a battery bank for supplying electric power to the reluctance motor.

The primary stator poles are simultaneously actuated and produce magnetic fields with alternating magnetic field orientations. The auxiliary stator poles are also simultaneously actuated, after actuation of the primary stator poles, and produce magnetic fields with alternating magnetic field orientations. In an embodiment, the alternating magnetic field orientations for the primary stator poles are opposite the alternating magnetic field orientations for the auxiliary stator poles.

When a primary stator pole and aligned auxiliary stator pole are actuated, each produces a magnetic field and the produced magnetic fields have opposite orientations.

BRIEF DESCRIPTION OF THE DRAWINGS

A more complete understanding of the method and apparatus of the present invention may be acquired by reference to the following Detailed Description when taken in conjunction with the accompanying Drawings wherein:

FIGS. 15 and 16 illustrate use of the switched reluctance machine as described herein as the power plant for an electric vehicle application.

DETAILED DESCRIPTION OF THE DRAWINGS

Figure 2:
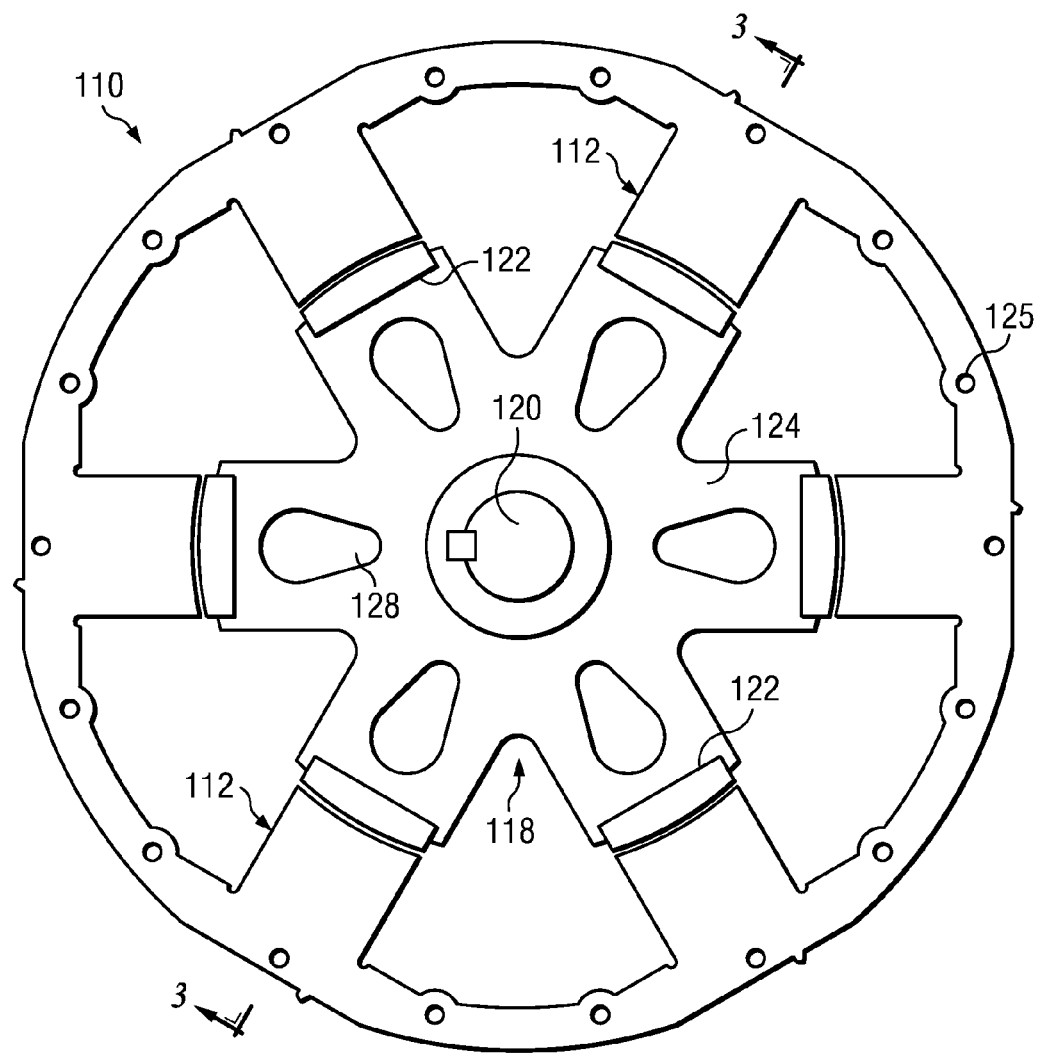
FIG. 2 illustrates the general configuration of a single phase switched reluctance machine of the N/N* topology.

Reference is now made to FIG. 2 wherein there is shown a schematic end view of a first embodiment of a single-phase switched reluctance machine. The single phase switched reluctance machine is generally of the N/N* topology, in this exemplary implementation N=6, but it will be understood that N could be any even integer (preferably N being greater than or equal to six, although N=2 or N=4 may be suitable in small or light duty applications). The reference to "N/N*" indicates that the machine has N rotor poles and N* stator poles, wherein the "*" designation indicates that each of the N stator poles comprises the combination of a primary stator pole PSP and an axially aligned auxiliary stator pole ASP (the axial alignment being in the direction of the axis of rotor rotation). The reference to "single-phase" indicates that there is only one overall switched stator energizing phase. The specific energization process for the primary stator poles PSP and auxiliary stator poles ASP will be described in more detail below.

The stator 110 of the switched reluctance machine is illustrated in an exemplary manner to include N=6 six stator poles 112. The rotor 118 is mounted to a shaft 120, and the shaft is supported for rotational movement relative to the stator 110. The rotor 118 is formed from at least one spoked web member 124, with a rotor pole 122 mounted at the distal end of each spoke of the spoked web member 124. Thus, the rotor 118 includes N=6 rotor poles 122 corresponding to the N=6 stator poles 112.

Figure 3:
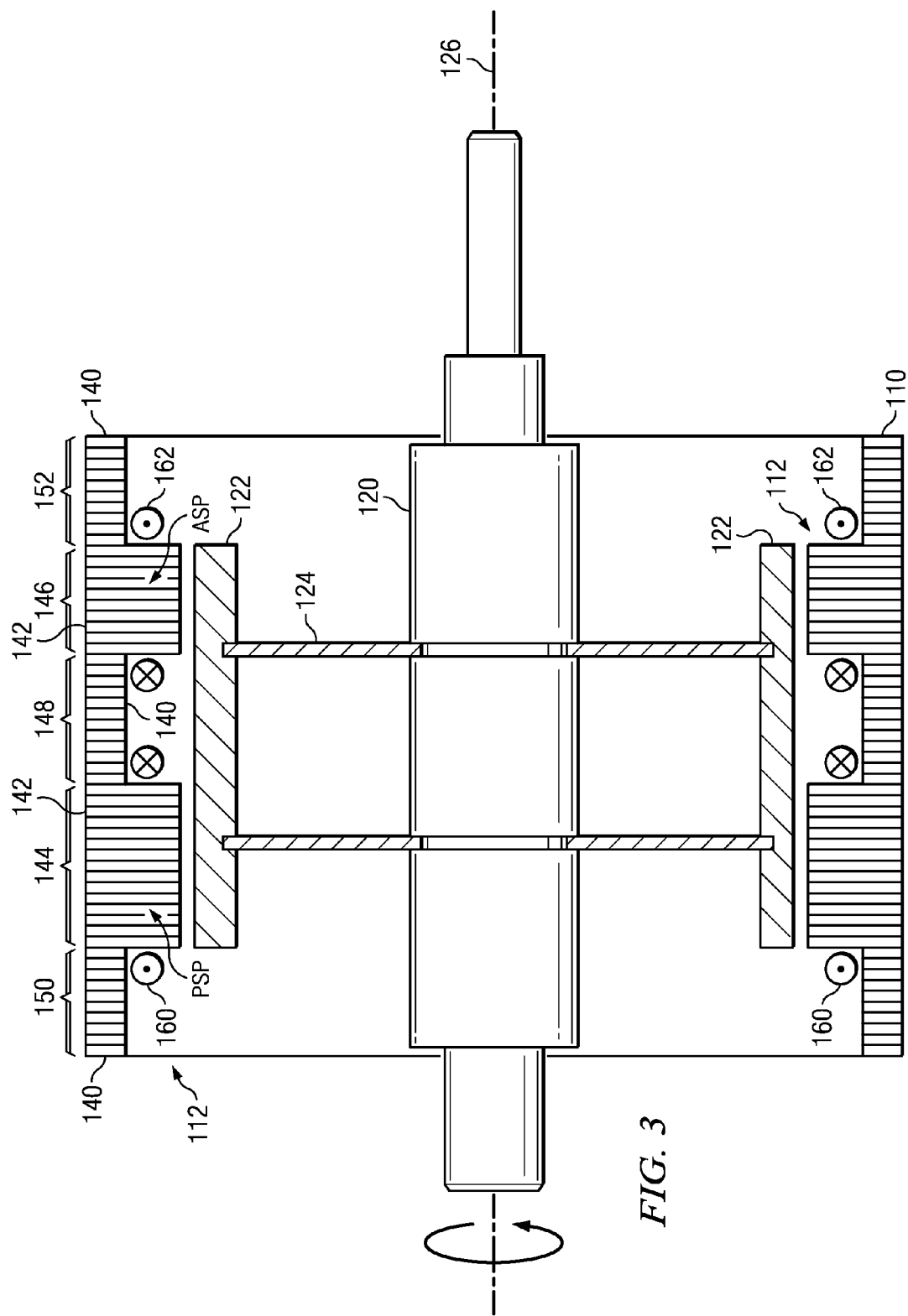
FIG. 3 illustrates a cross-sectional view taken along lines 3-3 of FIG. 2.

Each stator pole 112 comprises a primary stator pole PSP and an axially aligned auxiliary stator pole ASP (neither shown explicitly here, see FIG. 3). Illustration of the windings for the stator poles 112 is omitted in FIG. 2 because the primary stator pole PSP and axially aligned auxiliary stator pole ASP are separately wound and this cannot be adequately illustrated with the view of FIG. 2. More detail on the separate windings provided for the stator poles 112 (i.e., the primary stator pole PSP and auxiliary stator pole ASP) is provided in FIGS. 3, 6A and 6B.

Reference is now made to FIG. 3 which illustrates a cross-sectional view taken along lines 3-3 of FIG. 2. The shaft 120 rotates about an axis 126. Although not shown in FIG. 3, the two opposed ends of the shaft 120 are supported for such rotation by an end housing and bearing system in a manner well known to those skilled in the art (see, FIGS. 10, 11A and 11B). The shaft 120 may be made of any suitable material, including 1045 steel. The spoked web member 124 is mounted to the shaft and retained to be rotated with the shaft 120 without slipping. An appropriate fastening mechanism and keying system, as is well known to those skilled in the art, may be used to secure the spoked web member 124 to the shaft 120. The spoked web member 124 may be made of any suitable material, including mild or low hysteresis steel, aluminum or composite materials. Importantly, and unlike prior art implementations, the spoked web member 124 need not be made of a material which supports magnetic flux. Openings 128 (see, FIG. 2) are provided in each spoke of the spoked web member 124 to reduce the overall weight of the rotor 118 and position a greater proportion of the rotor's overall weight towards the perimeter of the rotor. One rotor pole 122 is mounted to the distal end of each spoke of the spoked web member 124. Each rotor pole 122 extends in an axial direction parallel to the shaft 120. FIG. 3 specifically illustrates the use of two spoked web members 124 to support opposite ends of each one of the N=6 rotor poles 122, but it will be understood that just a single spoked web member 124 could instead be used. Each rotor pole 122 may be made of any suitable material, including mild or low hysteresis steel, provided that the material supports a magnetic flux path in and along the length of the rotor pole 122 extending in the axial direction. Solid bar stock is preferred for the rotor pole 122, but laminated materials stacked parallel to the axial direction could also be used to form a suitable rotor pole.

Figure 4:
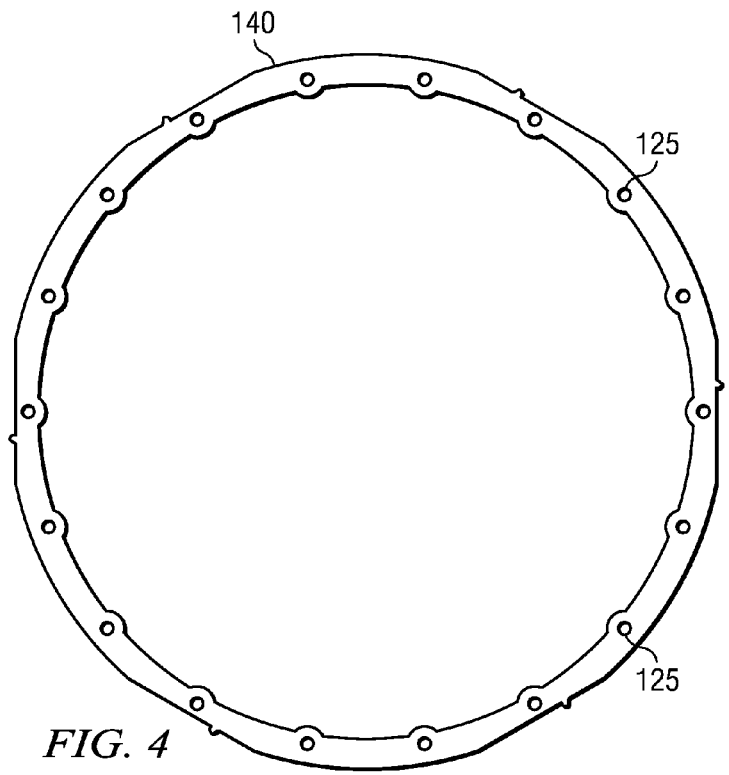
FIG. 4 illustrates a spacer ring member for use in making a laminated stator.
Figure 5:
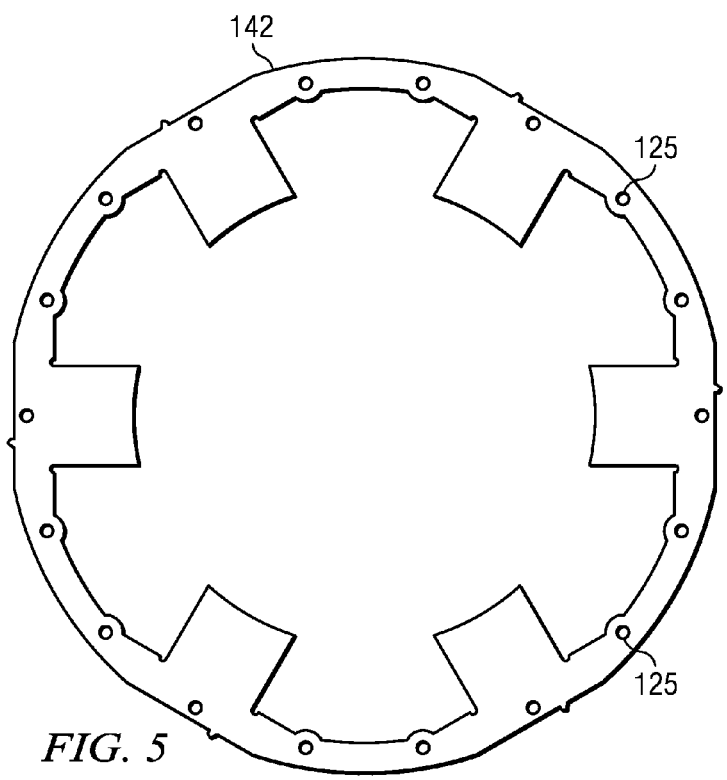
FIG. 5 illustrates a stator pole ring member for use in making a laminated stator.

The stator 110 is formed of a lamination of ring members, wherein the laminated materials are stacked perpendicular to the axial direction. The ring members include a spacer ring member 140 (see, FIG. 4) and a stator pole ring member 142 (FIG. 5). The ring members 140 and 142 may be made of any suitable material, including low hysteresis steel or other conventional laminate steel. The lamination of ring members to form a stator 110 with stator poles 112 is well known to those skilled in the art. Openings 125 are provided about the perimeter of the ring members 140 and 142 to assist in alignment and lamination of the stator ring members to form the stator 110. These openings further support the passage of a fastening means, such as a long bolt, when assembling the ring members together to form a stator.

The stator 110 is different from prior art laminated stator configurations in that each included stator pole 112 comprises a primary stator pole PSP and an axially aligned auxiliary stator pole ASP. The primary stator poles PSP are formed from a first lamination 144 of a plurality of stator pole ring members 142 (FIG. 5). The auxiliary stator poles ASP are formed from a second lamination 146 of a plurality of stator pole ring members 142 (FIG. 5). It will be noted that the first lamination 144 includes more stator pole ring members 142 (FIG. 5) in the stack than the second lamination 146. Thus, the primary stator poles PSP are larger (i.e., axially longer) than the axially aligned auxiliary stator poles ASP. The first lamination 144 forming the primary stator poles PSP is separated from the second lamination 146 forming the axially aligned auxiliary stator poles ASP by a third lamination 148 of a plurality of spacer ring members 140 (see, FIG. 4). The stator 110 is completed by a fourth lamination 150 of a plurality of spacer ring members 140 (see, FIG. 4) mounted to the first lamination 144 (this fourth lamination 150 separating the first lamination 144 for the primary stator poles PSP away from a first end of the machine), and a fifth lamination 152 of a plurality of spacer ring members 140 (see, FIG. 4) mounted to the second lamination 146 (this fifth lamination 152 separating the second lamination 146 for the auxiliary stator poles ASP away from a second end of the machine). Laminated construction with respect to the primary stator poles PSP (first lamination 144) and with respect to the axially aligned auxiliary stator poles ASP (second lamination 146) is preferred so that the supported magnetic flux paths in the stator are restrained in the radial and circumferential directions.

As mentioned above, each rotor pole 122 extends in an axial direction parallel to the shaft 120. The rotor poles 122 have an axial length substantially equal to a combined axial length of the PSP first lamination 144, ASP second lamination 146 and spacing third lamination 148. In other words, each rotor pole has an axial length sufficient to substantially and simultaneously cover the primary stator pole PSP and auxiliary stator pole ASP.

The primary stator pole PSP and the axially aligned auxiliary stator pole ASP of each included stator pole 112 are separately wound. Details of this separate winding are provided below with respect to FIGS. 6A, 6B, 7A and 7B.

Figure 6A:
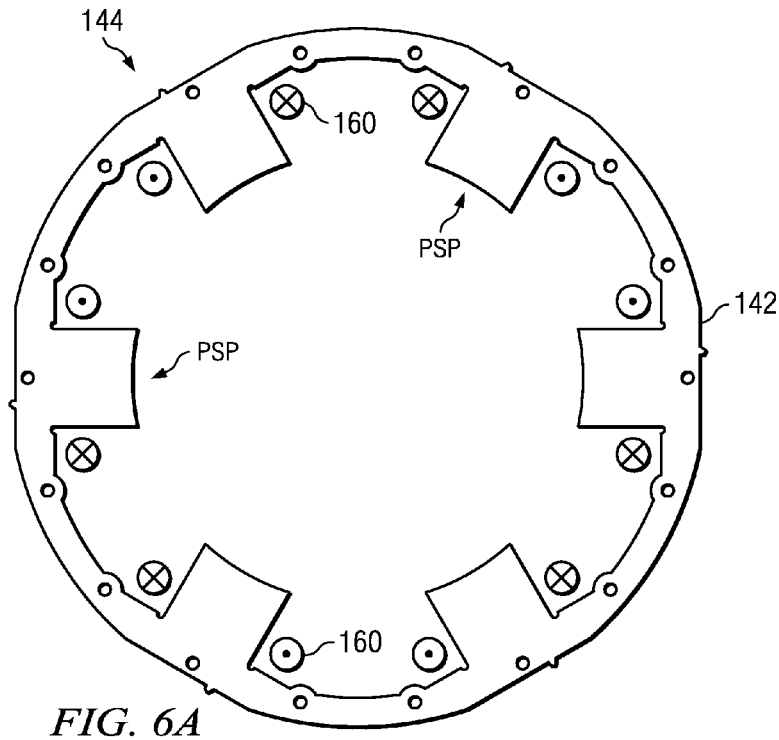
FIG. 6A illustrates the winding of the primary stator poles.

Reference is now made to FIG. 6A which shows the first lamination 144 for the primary stator poles PSP (made of a plurality of stacked stator pole ring members 142). Each primary stator pole PSP is wound with a winding 160. The windings 160 for the six primary stator poles PSP are electrically connected in parallel (see, also, FIG. 7A). The winding direction for each winding 160 is indicated using the "×" and "●" nomenclature (as described above). With the illustrated winding orientation, it will be noted that the magnetic orientation of the primary stator poles PSP when actuated alternates /S-N-S-N-S-N/ around the circumference of the stator 110. The windings 160 for the primary stator poles PSP are also shown in FIG. 3.

Figure 6B:
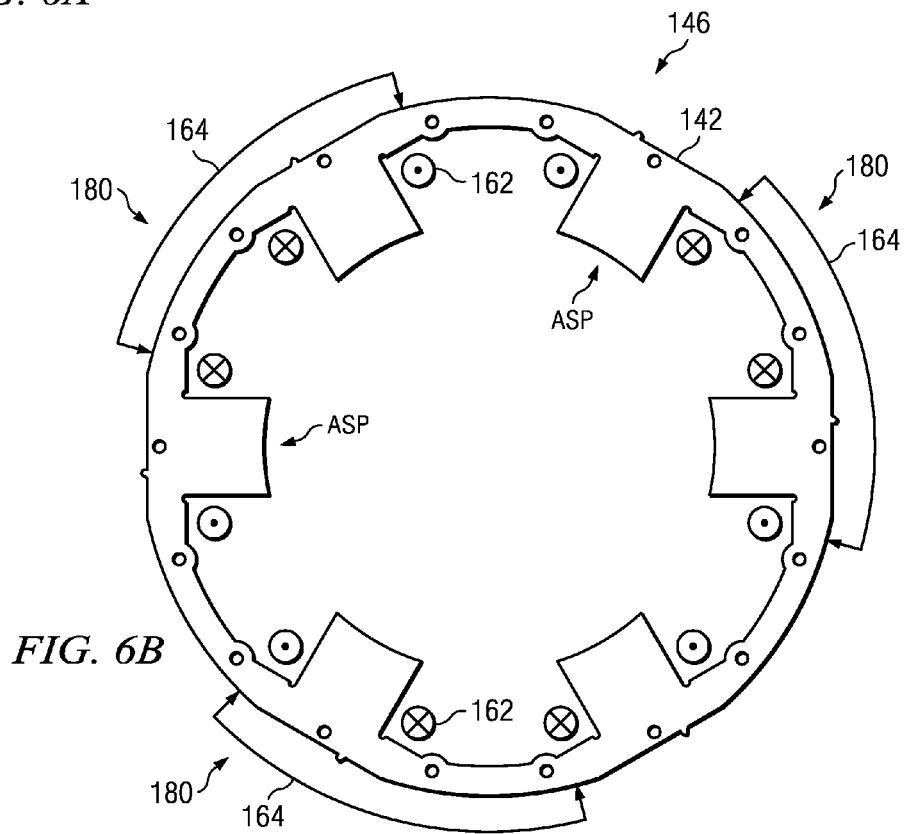
FIG. 6B illustrates the winding of the auxiliary stator poles.

Reference is now made to FIG. 6B which shows the second lamination 146 for the auxiliary stator poles ASP (made of a plurality of stacked stator pole ring members 142). Each auxiliary stator pole ASP is wound with a winding 162. The windings 162 for pairs 180 of the six auxiliary stator poles ASP are electrically connected in series (see connection 164) and the resulting three pairs 180 of windings 162 are connected in parallel (see, also, FIG. 7B). The winding direction is again indicated using the "×" and "●" nomenclature. With the illustrated winding orientation, it will be noted that the magnetic orientation of the auxiliary stator poles ASP when actuated alternates /N-S-N-S-N-S/ around the circumference of the stator 110. Importantly, this magnetic orientation is opposite (or reversed from) the /S-N-S-N-S-N/ of the primary stator poles PSP (FIG. 6A) such that the primary stator pole PSP and its axially aligned auxiliary stator pole ASP for a given stator pole 112 have opposite magnetic orientations (for example, for one stator pole 112, the included primary stator pole PSP will have an N orientation and the axially aligned auxiliary stator pole ASP will have an S orientation, or vice-versa). The windings 162 for the auxiliary stator poles ASP are also shown in FIG. 3.

Figure 7A:
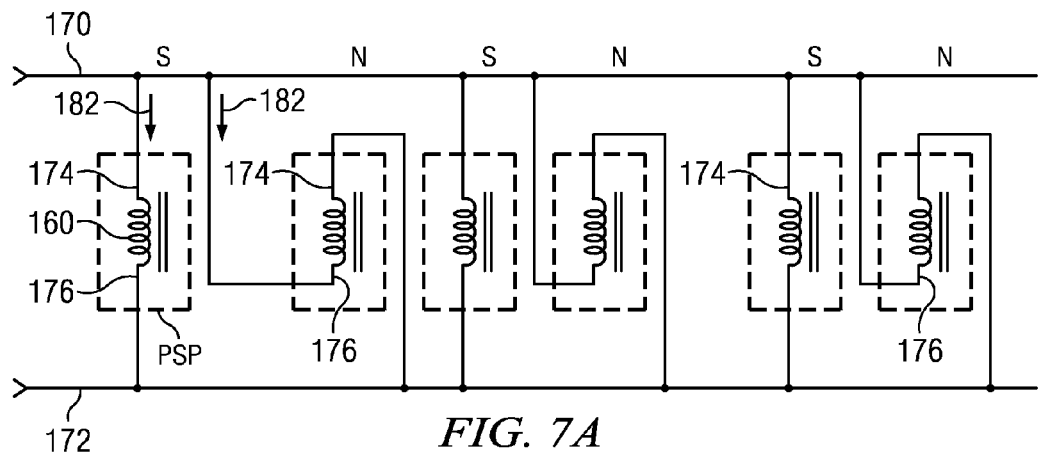
FIG. 7A illustrates the parallel circuit connection of the windings for the primary stator poles of FIG. 6A.

Reference is now made to FIG. 7A which illustrates the parallel circuit connection of the windings 160 for the primary stator poles PSP of FIG. 6A. The windings 160 are connected in parallel between a first node 170 and a second node 172. When the primary stator poles PSP are actuated, current flow 182 through the windings 160 is in a direction from the first node 170 towards the second node 172. Each winding 160 has a first end 174 and a second end 176. It will be noted that the end (174 or 176) which is connected to the first node 170 alternates with respect to adjacent ones of the primary stator poles PSP. Likewise, the end (174 or 176) which is connected to the second node 172 alternates with respect to adjacent ones of the primary stator poles PSP. The alternating connection of the first end 174 and second end 176 to the first node 170 and second node 172 produces alternating winding orientations for the primary stator poles PSP (as is shown in FIG. 6A) so that the magnetic orientation of the primary stator poles PSP when actuated alternates /S-N-S-N-S-N/ around the circumference of the stator 110.

Figure 7B:
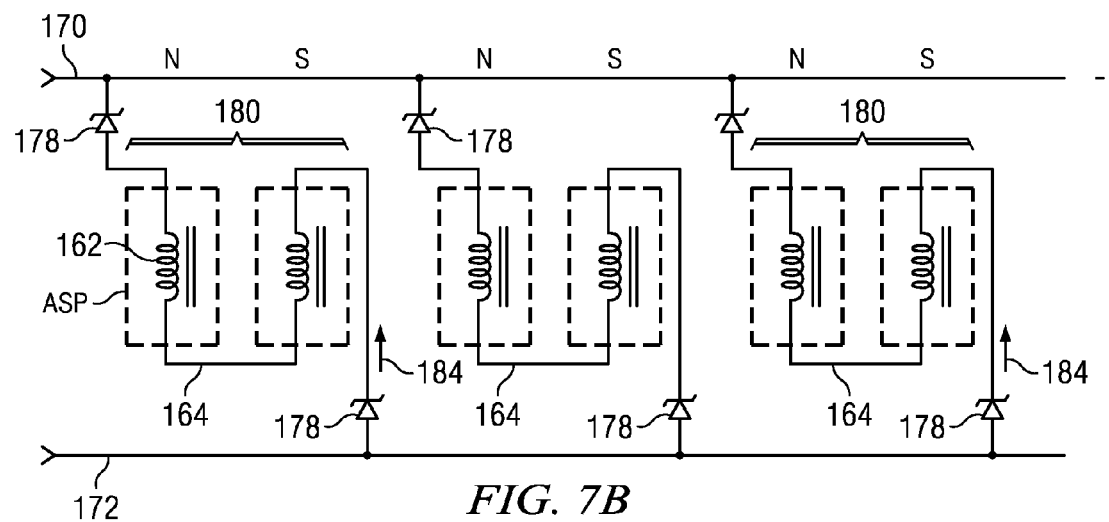
FIG. 7B illustrates the serial/parallel circuit connection of the windings for the auxiliary stator poles of FIG. 6B.

Reference is now made to FIG. 7B which illustrates the series/parallel circuit connection of the windings 162 for the auxiliary stator poles ASP of FIG. 6B. Pairs 180 of the windings 162 are connected in series by connection 164. The pairs 180 are then connected in parallel between the first node 170 and the second node 172. Each series connection of two windings 162 includes a pair of series connected zener diodes 178 oriented with their anodes pointing towards the second node 172 and their cathodes pointing towards the first node 170. This configuration of the zener diodes 178 precludes current flow through the series connected windings 162 in a direction from the first node 170 towards the second node 172, but permits current flow in the opposite direction (the reason for this is discussed in detail below, as is the reason for connecting pairs 180 of windings 162 in series). When the auxiliary stator poles ASP are actuated, current flow 184 through the windings 162 is in a direction from the second node 172 towards the first node 170. Each winding 162 has a first end 174 and a second end 176. It will be noted that the series connection 164 of the second ends 176 of the pairs of windings 162 produces alternating winding orientations for the auxiliary stator poles ASP (as is shown in FIG. 6B) so that the magnetic orientation of the auxiliary stator poles ASP when actuated alternates /N-S-N-S-N-S/ around the circumference of the stator 110 (this being the opposite of the /S-N-S-N-S-N/ configuration for the primary stator poles PSP).

Figure 8:
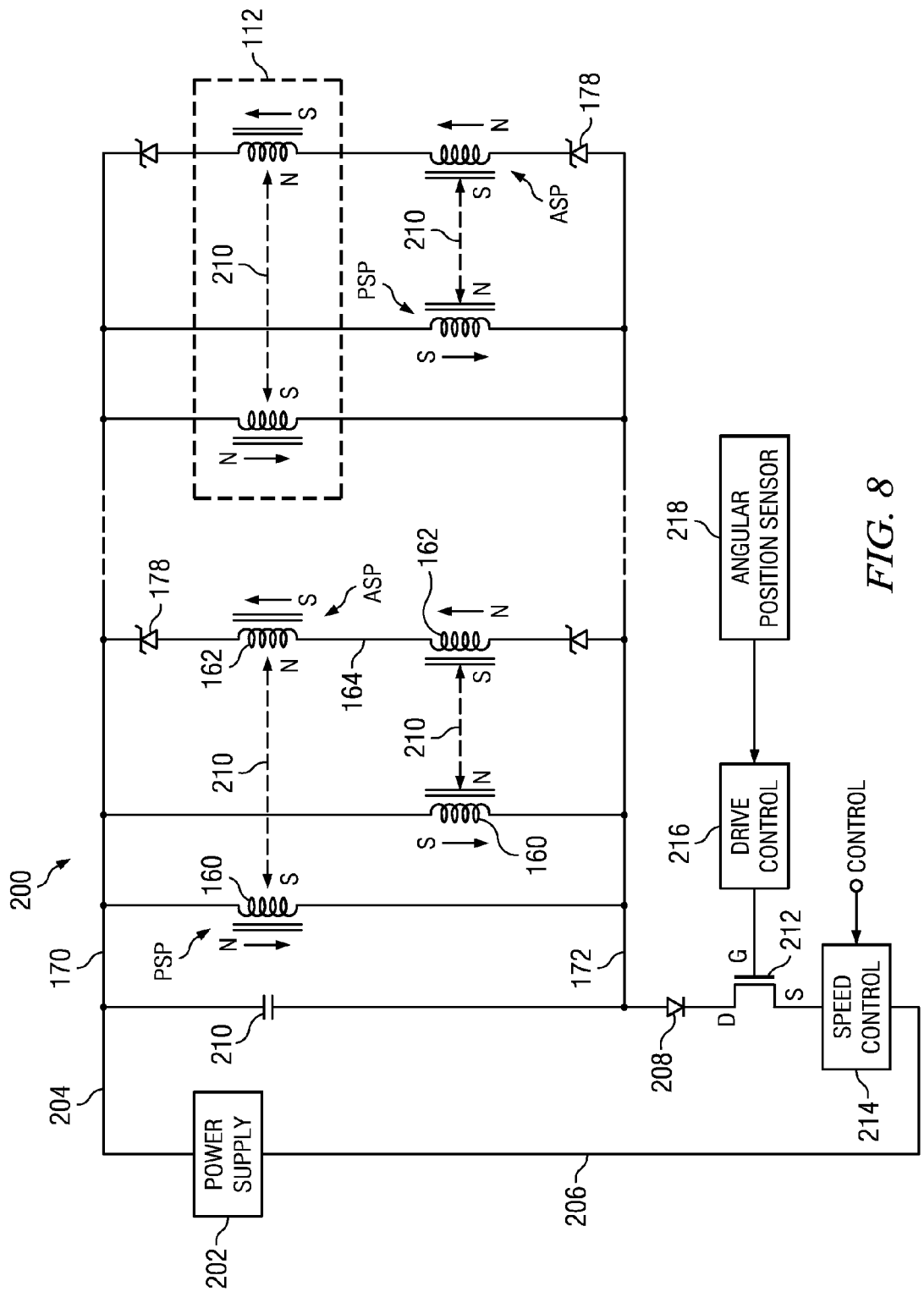
FIG. 8 illustrates a schematic diagram of a drive circuit for the switched reluctance machine.

Reference is now made to FIG. 8 which illustrates a schematic diagram of a drive circuit 200 for the switched reluctance machine. A power supply 202 has a more positive node 204 and a more negative node 206. The more positive node 204 could be a positive supply node, and the more negative node 206 could be a ground node. Conversely, the more positive node 204 could be a ground node, and the more negative node 206 could be a negative supply node. The more positive node 204 is coupled to the first node 170. Coupled between the first node 170 and the second node 172 is a capacitor 210 (optional but recommended to retard a high frequency runaway condition). Also coupled between the first node 170 and second node 172 is the primary stator poles PSP winding circuit shown in FIG. 7A and the auxiliary stator poles ASP winding circuit shown in FIG. 7B. FIG. 8 does not illustrate all of the windings 160 and 162 as shown in FIGS. 7A and 7B. Rather, only four of the windings 160 and four of the windings 162 are shown to simplify the drawing.

FIG. 8 further illustrates the shared electrical and magnetic connection relationship of the primary stator poles PSP winding circuit (FIG. 7A) and the auxiliary stator poles ASP winding circuit (FIG. 7B) relative to the first node 170 and second node 172. The format of the winding connections and orientations in FIG. 8 is different from that shown in FIGS. 7A and 7B in order to simplify the circuit drawing and assist in making the operation of the circuit 200 more understandable. With respect to the physical implementation in forming the primary stator poles PSP and the auxiliary stator poles ASP, the windings 160 and 162 are drawn with different orientations (left and right) to indicate the use of alternate winding directions. Each winding 160 and 162 is further provided with a labeled arrow (N→ or S→). The arrow direction is consistent with the direction of current flow when the respective stator poles are actuated. The label (either "N" or "S") indicates the orientation of the magnetic field produced in response to that direction of current flow (noting again that the magnetic orientation alternates /S-N-S-N-S-N/ around the circumference of the stator 110 for the primary stator poles PSP, and alternates /N-S-N-S-N-S/ around the circumference of the stator 110 for the auxiliary stator poles ASP). Still further with respect to the physical implementation, FIG. 8 includes a labeled dashed bi-directional arrow (N←---→S or S←---→N) 210 indicating the axial alignment between one primary stator pole PSP (with winding 160) and its axially aligned auxiliary stator pole ASP (with winding 162), as well as indicating the magnetic coupling between one primary stator pole PSP and its axially aligned auxiliary stator pole ASP. As will be discussed below, that magnetic coupling is provided through the axially extending rotor pole 122. Thus, the bi-directional arrow 210 may be understood to represent a rotor pole 122. The label (either "N" or "S") on the end of the bi-directional arrow 210 indicates the orientation of the magnetic field in the rotor pole 122 when the primary stator pole PSP and auxiliary stator pole ASP are actuated.

An axially aligned 210 primary stator pole PSP and auxiliary stator pole ASP define one stator pole 112 as is shown in FIGS. 2 and 3. It will be noted that when actuated, the primary stator pole PSP has one magnetic field orientation (for example, N) while its axially aligned auxiliary stator pole ASP has the opposite magnetic field orientation (for example, S). The two ends of the rotor pole 220 (schematically represented by the bi-directional arrow 210) will have opposite magnetic field orientations (S and N, respectively, for this example) and thus will be attracted to the stator pole 112. It is this attraction which produces torque causing rotation of the rotor.

The second node 172 is coupled to the drain D of an n-channel power switching MOSFET 212. An optional snubber diode 208 may be inserted between the second node 172 and the drain D of the n-channel power switching MOSFET 212. A speed control circuit 214 is coupled between the source S of the MOSFET 212 and the more negative node 206 of the power supply 202. The speed control circuit 214 may comprise, for example, an Alltrax speed controller. The gate G of the MOSFET 212 is coupled to the output of a drive control circuit 216. The drive control circuit 216 generates a gate drive signal to control switching on/off of the MOSFET 212. Changes in state of the gate drive signal are produced in response to information relating to the angular position of the rotor. This obtained angular position of the rotor is detected by an angular position sensor 218. The sensor 218 in a preferred implementation comprises an optical sensor coupled to the shaft of the rotor. Such optical sensors are well known to those skilled in the art (see, also, FIG. 13).

The general functional operation of the MOSFET 212, drive control circuit 216 and angular position sensor 218 will now be described. The angular position sensor 218 detects the angular position of the rotor, and more specifically detects the position of the rotor poles relative to the stator poles. Responsive to detection by the angular position sensor 218 of a desired relative position relationship between those poles (such as the position shown in FIG. 9A), the drive control circuit 216 generates the gate drive signal with a state to turn on the MOSFET 212. Assuming that the speed control circuit 214 is also activated, current will flow from the more positive node 204 of the power supply 202 towards the more negative node 206. This current flows through the windings 160 and simultaneously activates the primary stator poles PSP. In this mode, the zener diodes 178 prevent current from flowing through the windings 162 of the auxiliary stator poles ASP in a direction from the first node 170 to the second node 172 (i.e., these stator poles are not actuated).

Figure 1A:
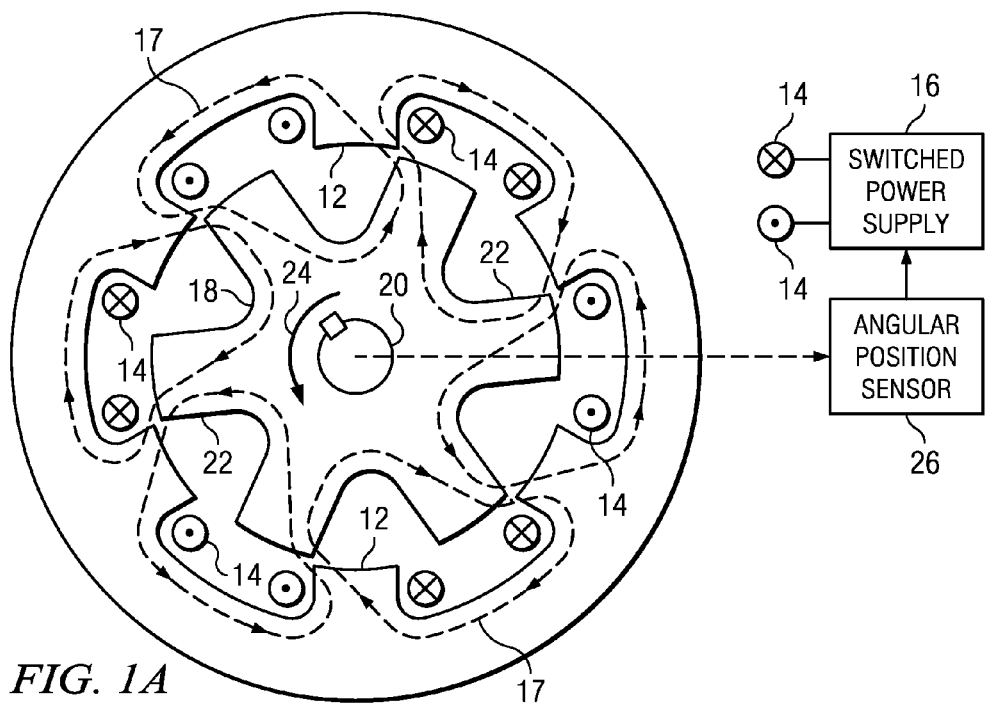
FIGS. 1A and 1B (previously discussed) illustrate the general configuration and operation of a simple single phase switched reluctance machine of the 6/6 topology.
Figure 1B:
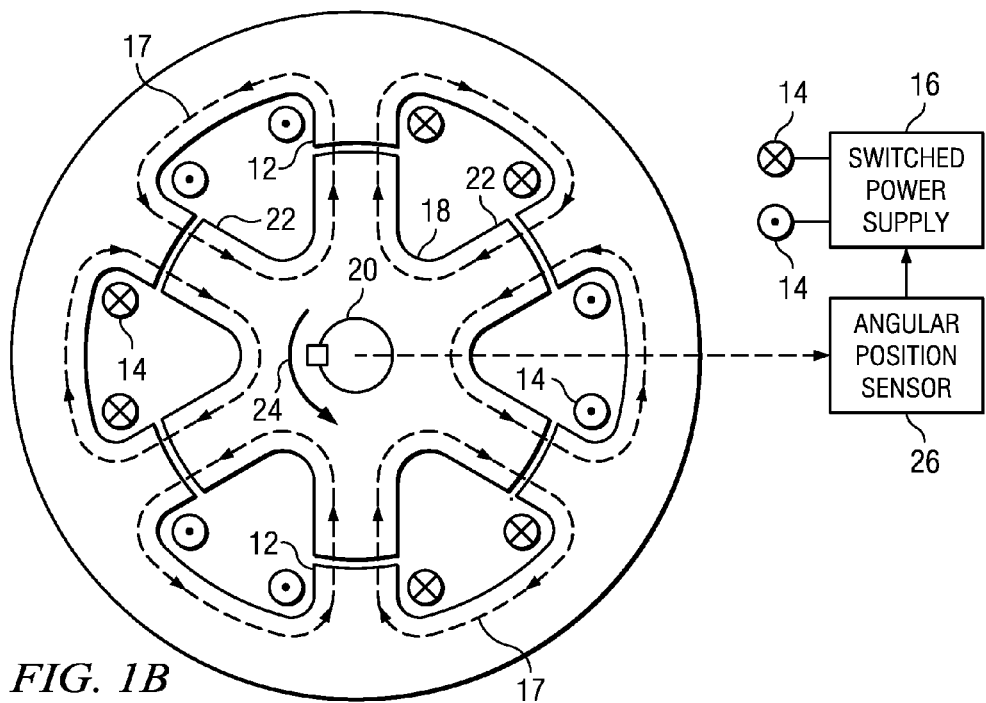

At this point, the motor is operating in a manner generally similar to that shown and described above with respect to FIGS. 1A and 1B. The rotor poles 122 are attracted to the energized stator poles 112, and more particularly to the primary stator poles PSP, producing a torque on the shaft 120 as the rotor poles 122 move towards the energized stator poles 112 in an effort to minimize the reluctance. However, unlike the implementation of FIGS. 1A and 1B, the magnetic flux paths do not primarily run through the spoked web member 124, but rather run along the length of the rotor poles 122 and through the (un-actuated) auxiliary stator poles ASP. This flux configuration is described in detail below and illustrated in connection with FIGS. 9B, 9C and 9E where the auxiliary stator poles ASP are actuated.

When the angular position sensor 218 detects that the rotor poles 122 have moved close to the position of minimized reluctance, for example where the rotor pole 122 is nearly, but not completely, aligned with the stator pole 112 (such as the position shown in FIG. 9B), the drive control circuit 216 turns off the MOSFET 212. This isolates the second node 172 from the more negative node 206 of the power supply 202. A large high voltage inductive pulse is then generated at the second node 172. In prior art implementations, this large high voltage inductive pulse is typically dissipated and the stored magnetic energy in the stator windings is wasted. In the motor embodiment described herein, however, the stored magnetic energy is put to more productive use.

The large high voltage inductive pulse at second node 172 has a voltage magnitude that is sufficient to forward bias the zener diodes 178 (thus actuating the auxiliary stator poles ASP). The generated inductive pulse is accordingly dumped through the pairs of series connected windings 162 for the auxiliary stator poles ASP. Because of the size of the inductive pulse, a large impedance must be present in the dumping circuit path. This large impedance is provided by connecting two of the windings 162 for the auxiliary stator poles ASP in series. It will, however, be understood that the windings 162 for the auxiliary stator poles ASP could instead be connected in parallel (similar to that of the windings 160 for the primary stator poles ASP) provided that a single winding 162 presented a sufficiently high impedance value in relation to the high voltage inductive pulse.

Figure 9A:
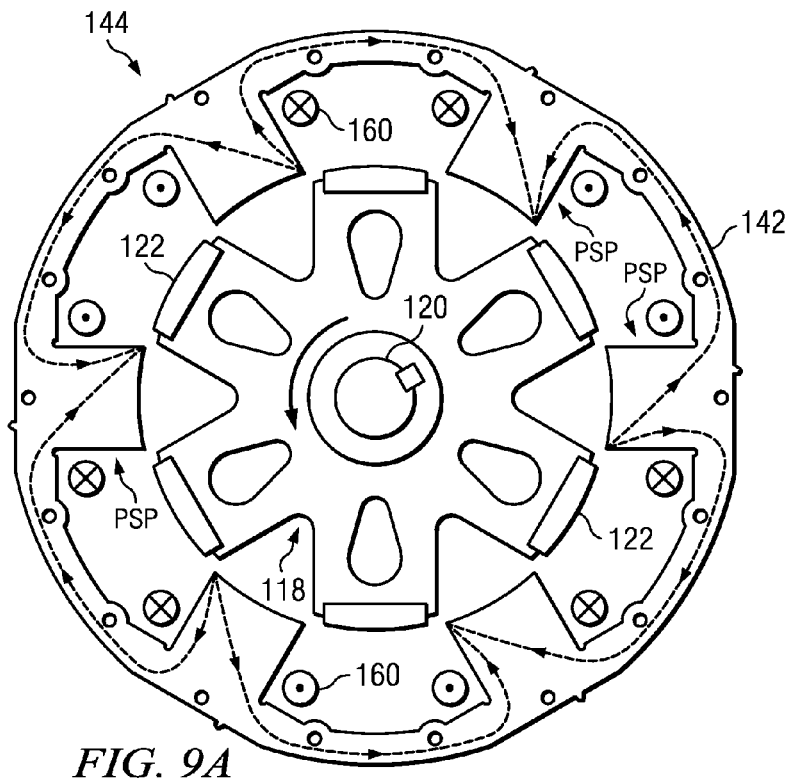
FIGS. 9A-9D illustrate operation of the motor.
Figure 9B:
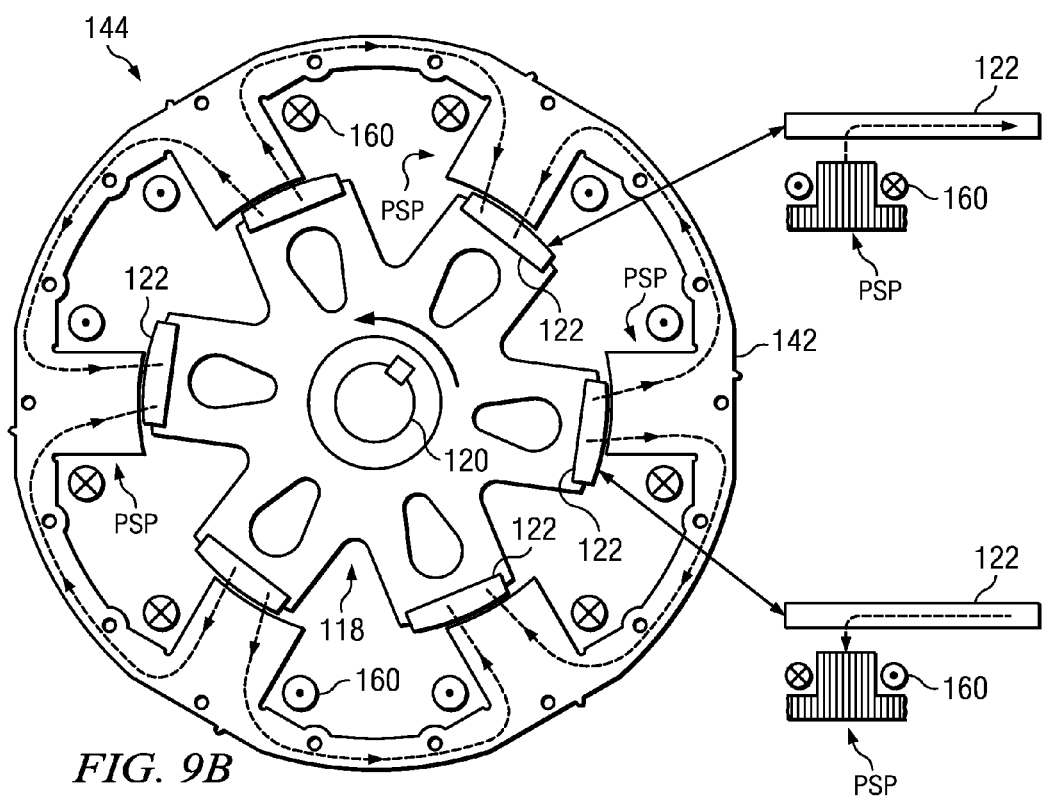
Figure 9C:
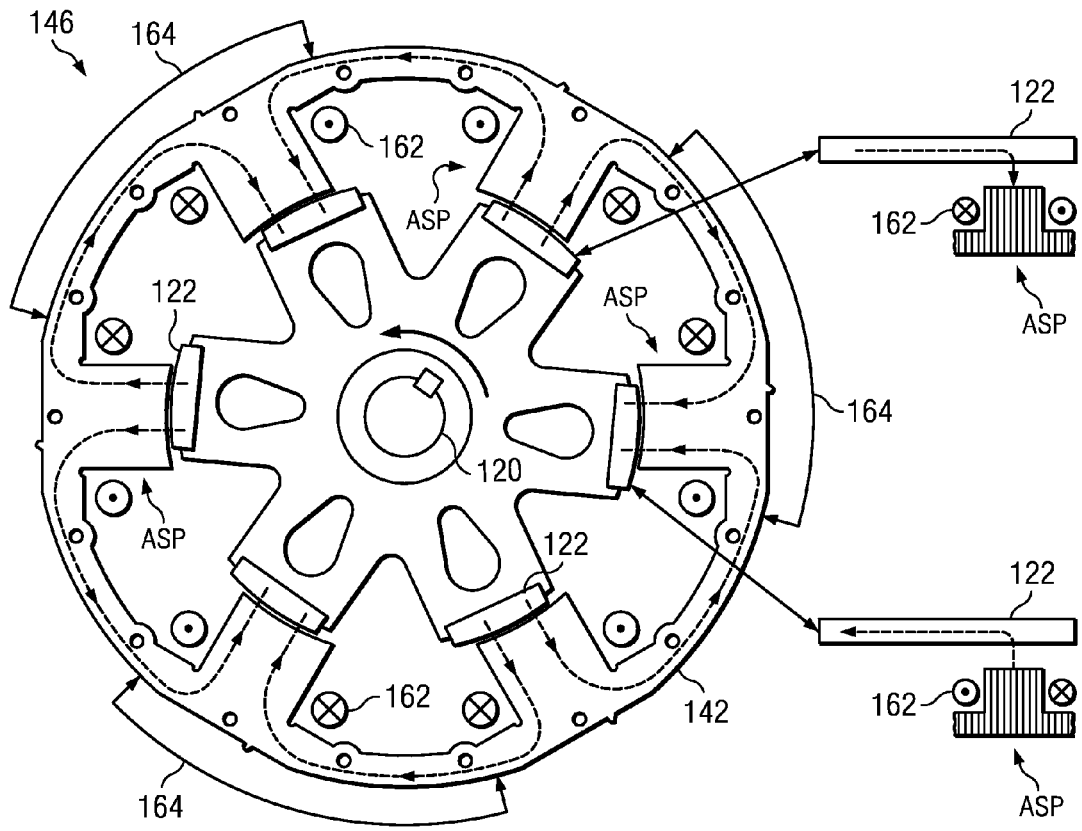
Figure 9D:
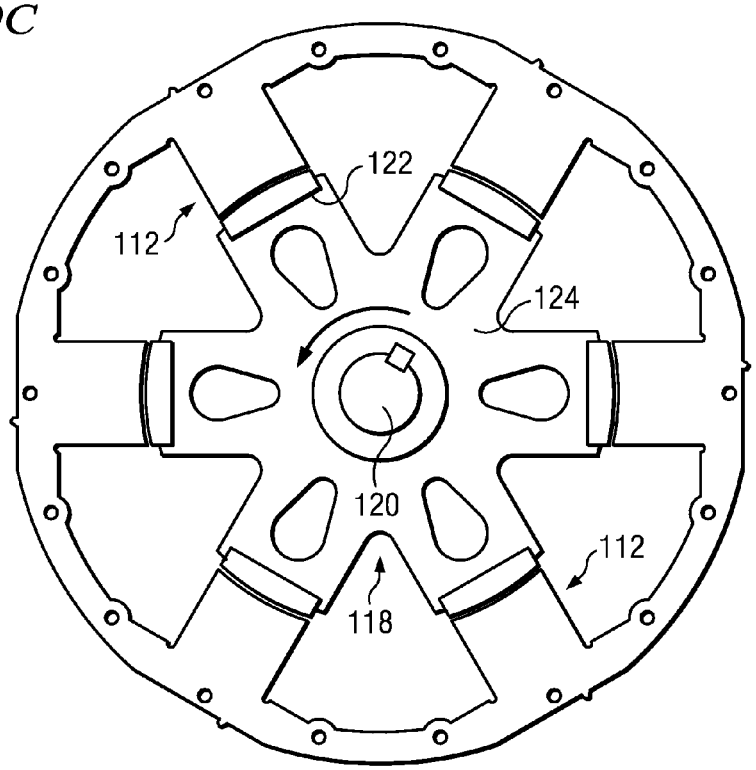
Figure 9E:
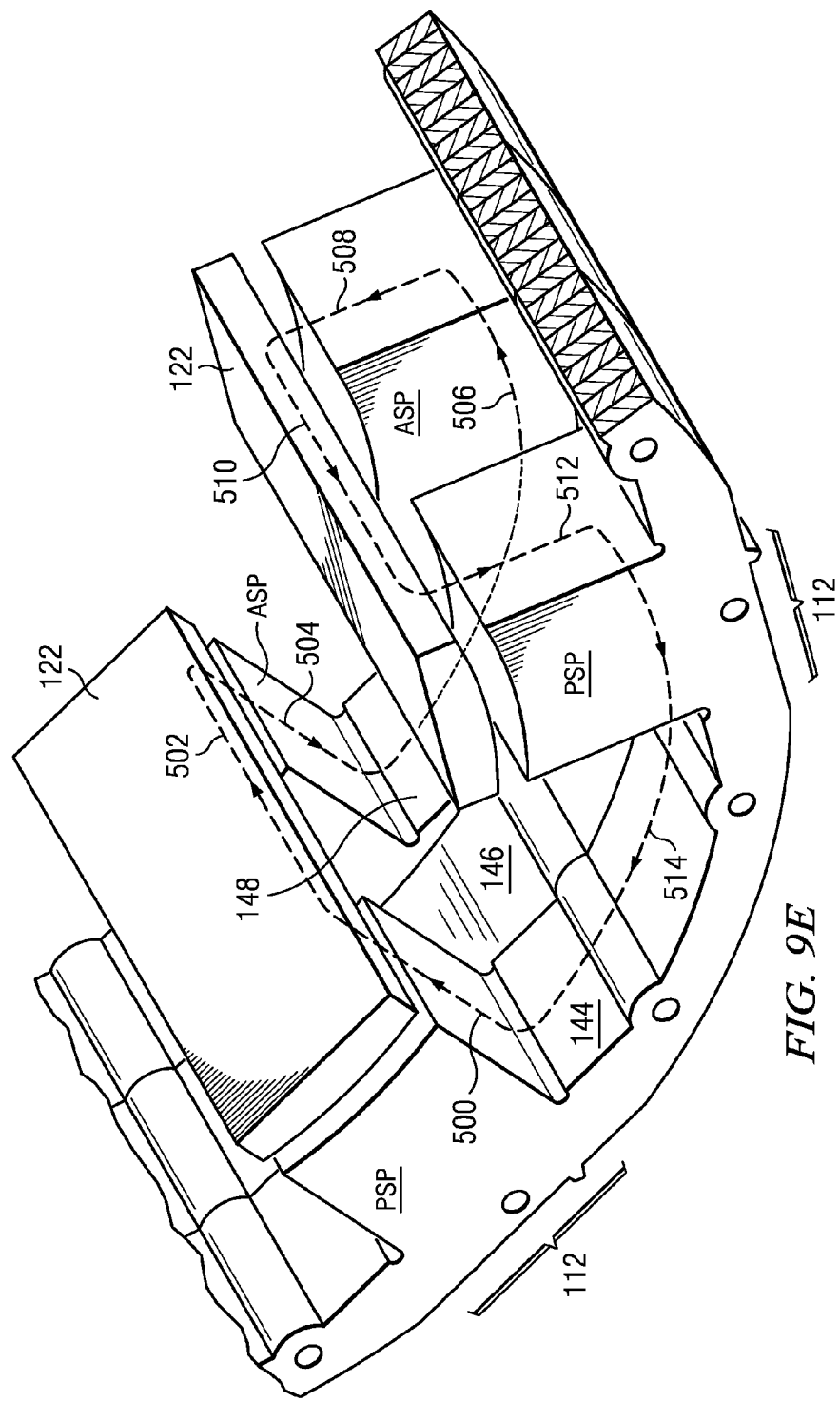
FIG. 9E illustrates magnetic flux paths with respect to the rotor and stator poles.

The magnetic flux paths with respect to the actuated primary stator poles PSP, actuated auxiliary stator poles ASP and the rotor poles 122 are shown in FIG. 9B (for the primary stator poles PSP), FIG. 9C (for the auxiliary stator poles ASP) and FIG. 9E for the stator and rotor poles together. These paths flow from a first primary stator pole and cross the air gap to a first end of a first rotor pole (path segment 500), flow along the length of the first rotor pole to a second end of the first rotor pole (path segment 502), cross the air gap to a first auxiliary stator pole (that is axially aligned with the first primary stator pole) (path segment 504), flow from the first auxiliary stator pole in the stator laminations to a second auxiliary stator pole adjacent thereto (path segment 506), cross the air gap from the second auxiliary stator pole to a first end of a second rotor pole (path segment 508), flow along the length of the second rotor pole to a second end of the second rotor pole (path segment 510), and cross the air gap from the second rotor pole to a second primary stator pole (that is adjacent to the first primary stator pole) (path segment 512), and flow from the second primary stator pole in the stator laminations to the first primary stator pole adjacent thereto (path segment 514). FIGS. 9B and 9C additionally show the portion of the magnetic flux paths which pass axially along the length of the rotor pole 122 in a separate breakout, while these paths are shown in context with the stator magnetic flux paths in FIG. 9E.

The rotor poles 122 continue to be attracted to the energized stator poles 112, at this point actively to both the primary stator poles PSP and the auxiliary stator poles ASP, producing a continued torque on the shaft 120 as the rotor poles 122 continue to move towards the energized stator poles 112 in an effort to minimize the reluctance.

At this point, because the MOSFET 212 has been turned off, and because the inductive pulse has been completely dumped and put to work through the windings 162 of the auxiliary stator poles ASP, the stator poles 112 are now de-energized. Angular momentum is preserved and the rotor continues to rotate such that the rotor pole 122 passes past the de-energized stator pole 112. After a delay period which allows the rotor pole 122 to move sufficiently away from the stator pole 112 (i.e., closer to the next stator pole as shown in FIG. 9A), the angular position sensor 218 again senses that the rotor is in the desired relative position relationship, the drive control circuit 216 turns on the MOSFET 212, and the process repeats.

Speed of rotor rotation can be controlled by changing the current supplied to the windings 160 of the primary stator poles PSP. This is accomplished by operation of the speed control circuit 214 to adjust the voltage drop from the source S of the MOSFET 212 to the more negative node 206 of the power supply 202.

Figure 10:
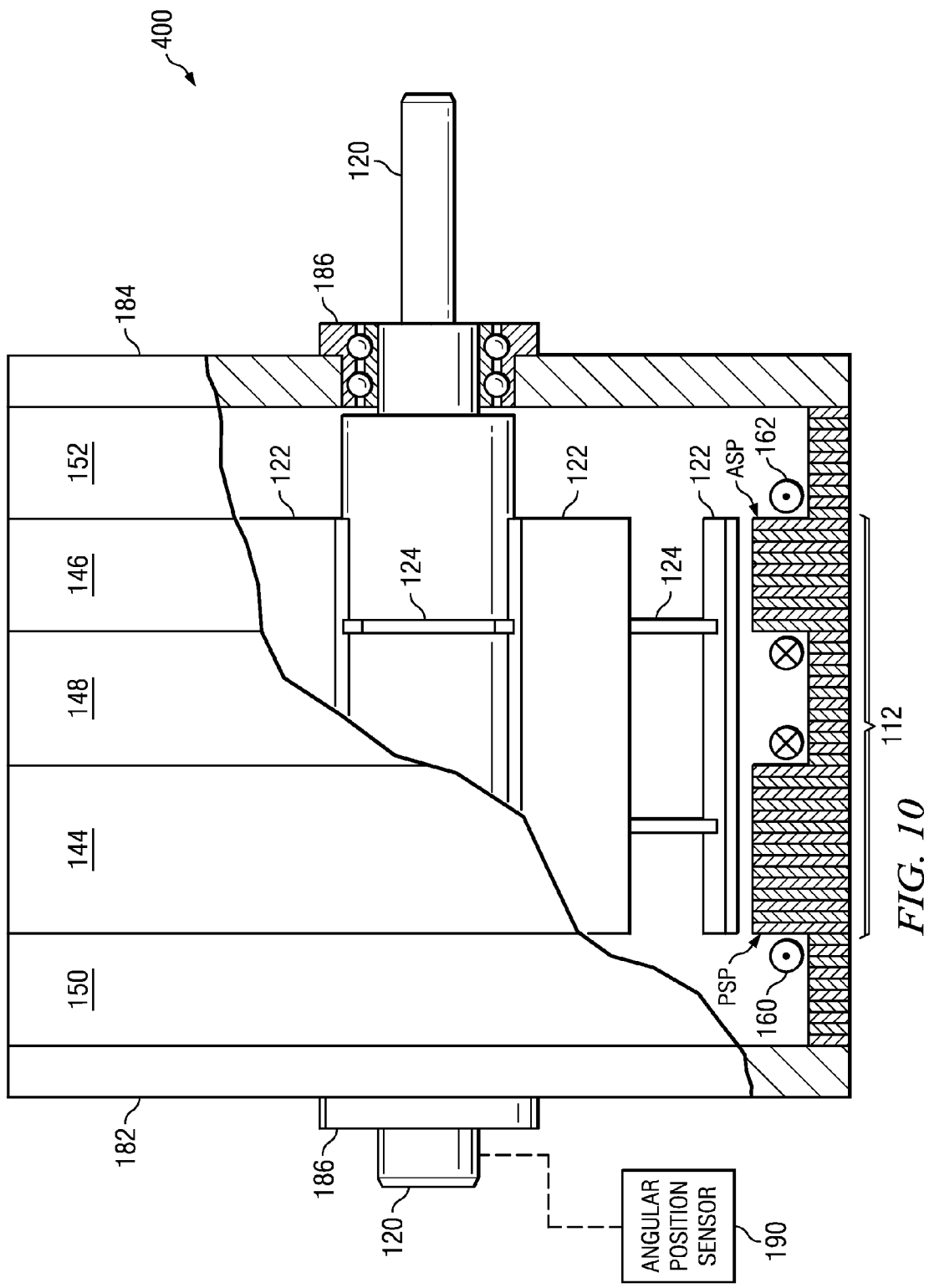
FIG. 10 illustrates a partial cross-section and side view of an assembled switched reluctance machine.

Reference is now made to FIG. 10 which illustrates a partial cross-section and side view of the switched reluctance machine 400 as described above. End housing members 182 and 184 are provided at opposite ends of the machine. A bearing system 186 is installed on each housing member to support rotation of the shaft 120. One end of the shaft 120 is coupled to an angular position sensor 190. Such sensors are well known to those skilled in the art. In a preferred implementation, the sensor 190 is implemented as an optical light gap sensor. A slotted wheel is mounted to the shaft, with the slots having a known positional relationship relative to the positions of the rotor poles and stator poles. Light is projected onto the wheel to pass through the slots. A light sensor detects the light passing through the slots in the wheel, and the detected light provides information concerning position of the rotor poles. See, also, FIG. 13.

The machine 400 as shown in FIG. 10, when configured as a motor, is not self-starting because the rotor could stop rotating at a position where the rotor poles were aligned with the stator poles (the minimized reluctance position). To address this issue, the motor of FIG. 10 could further include a parking magnet which attracts the rotor poles to a position offset from the stator poles and from which starting is possible. Alternatively, the rotor poles could be shaped with a configuration that permits self-starting from any rotor position including when aligned with the stator poles. Parking magnet and self-starting rotor pole shape solutions are well known to those skilled in the art.

Figure 11A:
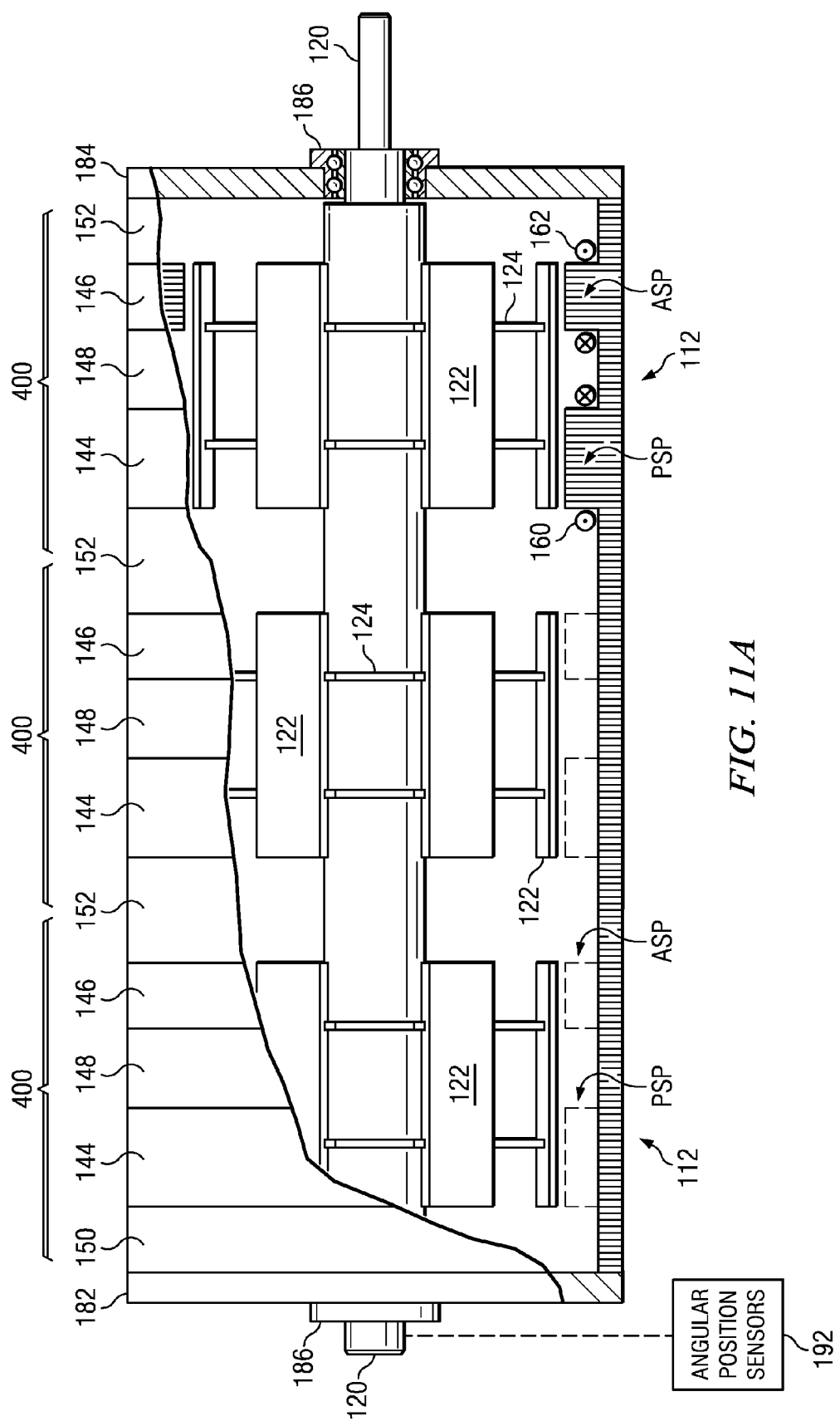
FIGS. 11A and 11B illustrate a partial cross-section and side view for alternative arrangements of an assembled stacked multiple switched reluctance machine.
Figure 11B:
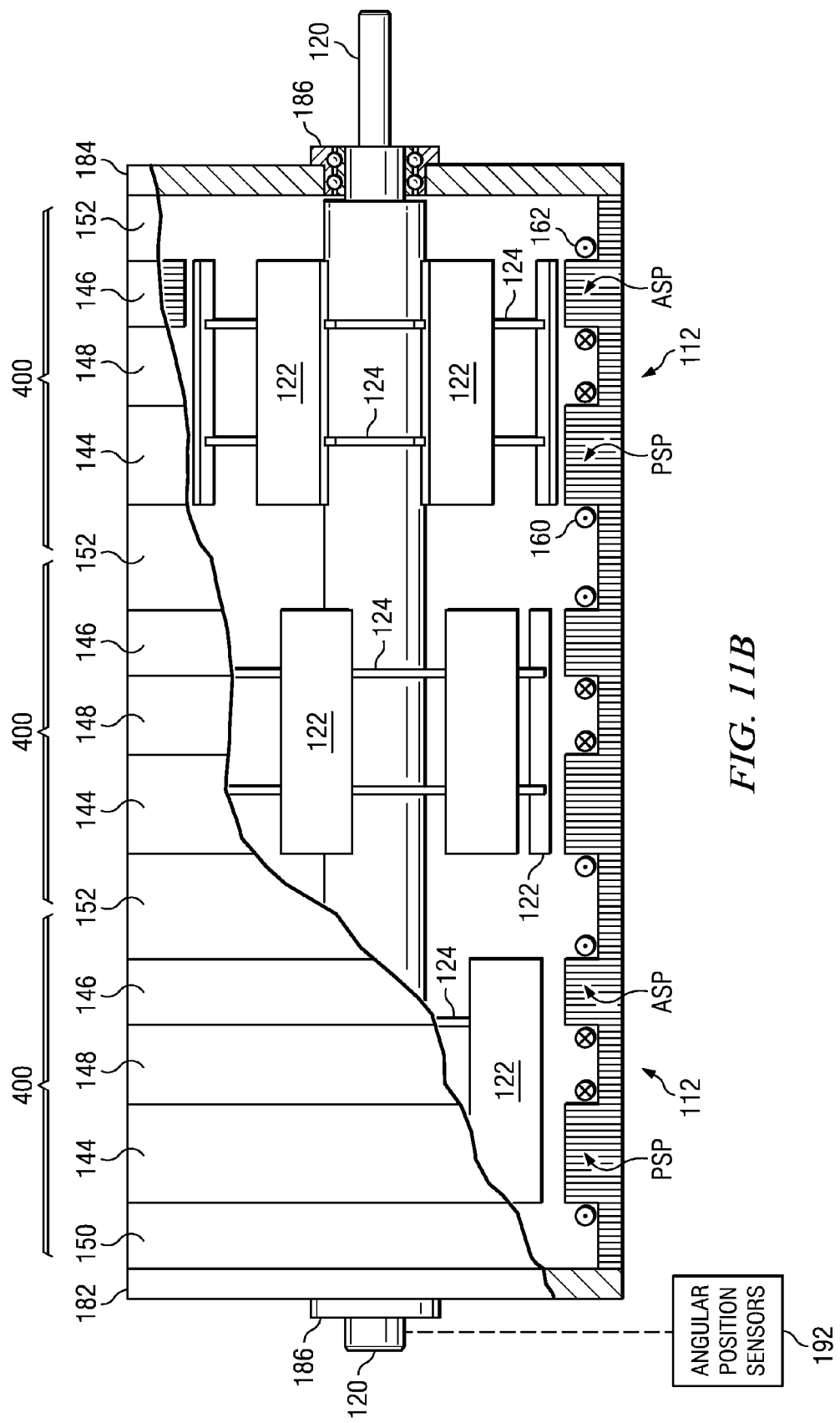
Figure 11C:
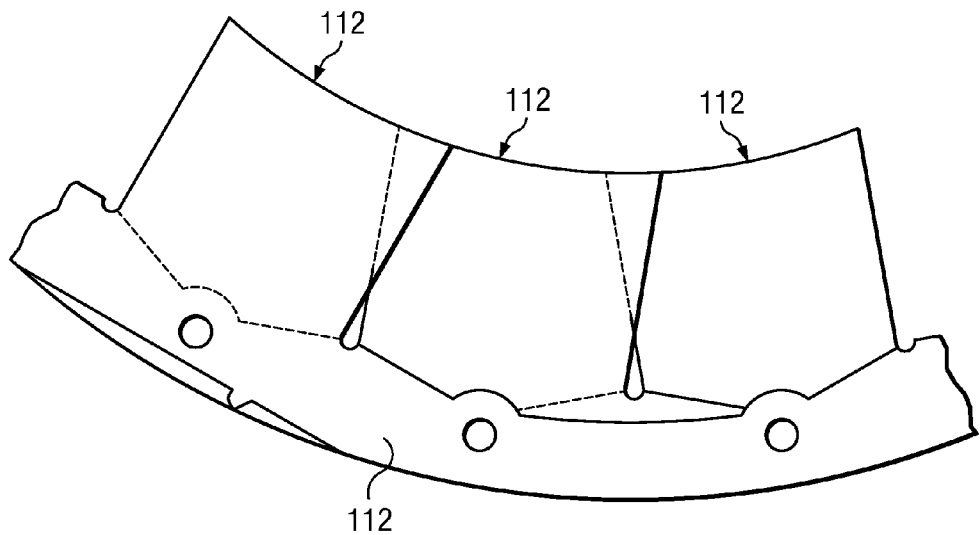
FIG. 11C illustrates angular offsetting of the stator poles for an assembled stacked multiple switched reluctance machine as shown in FIG. 11A.

In a further embodiment, multiple switched reluctance machines 400 (one such machine 400 as is shown in FIG. 10) can be stacked on a common shaft 120. By angularly offsetting the multiple machines from each other, the stacked machine presents a motor configuration that is self-starting because the rotor poles of at least one of the machines 400 will be sufficiently offset from the stator poles to allow for magnetic attraction and torque generation. For example, the angular offset could be introduced by angularly offsetting the stator poles and keeping the rotor poles in alignment. This configuration is shown in FIGS. 11A and 11C. In FIG. 11A it will be noted that dotted boxes are used to indicate the location of the angularly offset stator poles 112, while FIG. 11C illustrates that angular offset. Alternatively, the angular offset could be introduced by angularly offsetting the rotor poles and keeping the stator poles in alignment. This configuration is shown in FIG. 11B. An angular offset of 360/(M*N) degrees between each of the included machines 400 is acceptable (when M is the number of machines 400 in the stack). In the implementation of FIGS. 11A and 11B, the angular offset may, for example, comprise 10-25 degrees. FIGS. 11A and 11B specifically illustrate a preferred angular offset between machines 400 of 20 degrees (360/(3*6)).

End housing members 182 and 184 are provided at opposite ends of the machine. A bearing system 186 is installed on each housing member to support rotation of the shaft 120. One end of the shaft 120 is coupled to a set of angular position sensors 192. Such sensors are well known to those skilled in the art. In a preferred implementation, the sensors 192 are each implemented as an optical light gap sensor. A slotted wheel is mounted to the shaft, with the slots having a known positional relationship relative to the position of the rotor poles relative to the stator poles. Light is projected onto the wheel to pass through the slots. A light sensor associated with each machine 400 detects the light passing through the slots in the wheel, and the detected light provides information concerning position of the rotor poles. See, also, FIG. 13.

Figure 12:
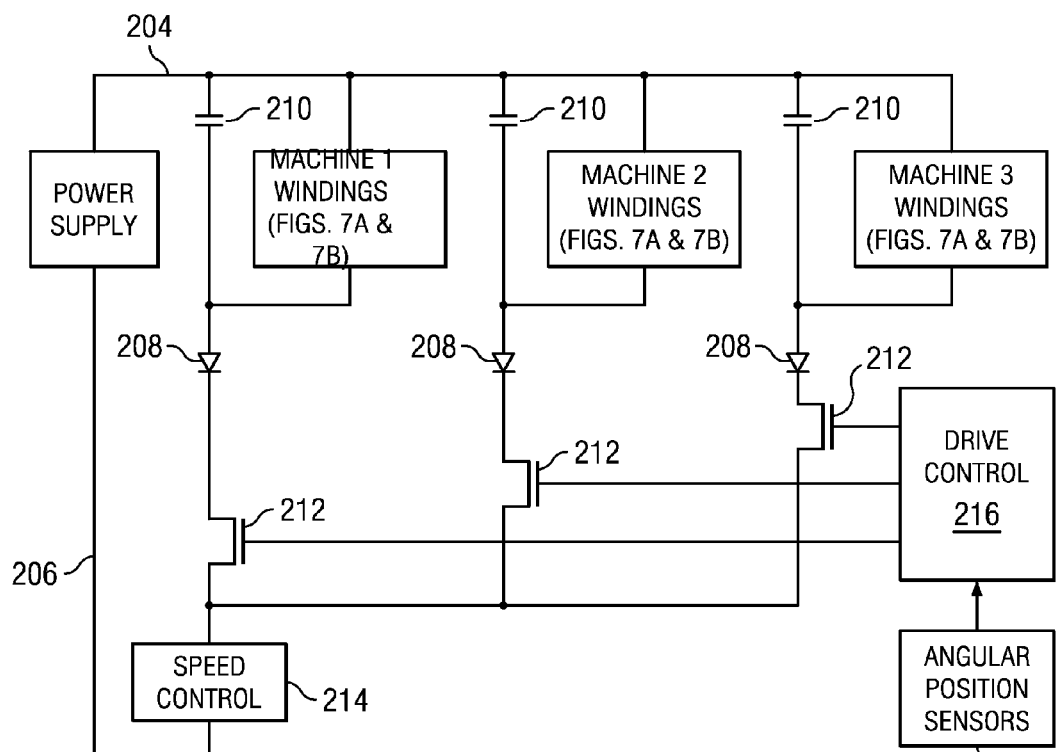
FIG. 12 illustrates a schematic diagram of a drive circuit for the switched reluctance machine of FIGS. 11a and 11B.

Reference is now made to FIG. 12 which illustrates a schematic diagram of a drive circuit for the switched reluctance machine of FIGS. 11A and 11B. Because multiple switched reluctance machines 400 are present, multiple drive circuits are required. Each drive circuit is of the type shown in FIG. 8 and previously described. The circuit of FIG. 12, however, shares speed control 214 across the three machines, and the angular position sensors 218 provide position information relative to each of the machines 400.

Figure 13:
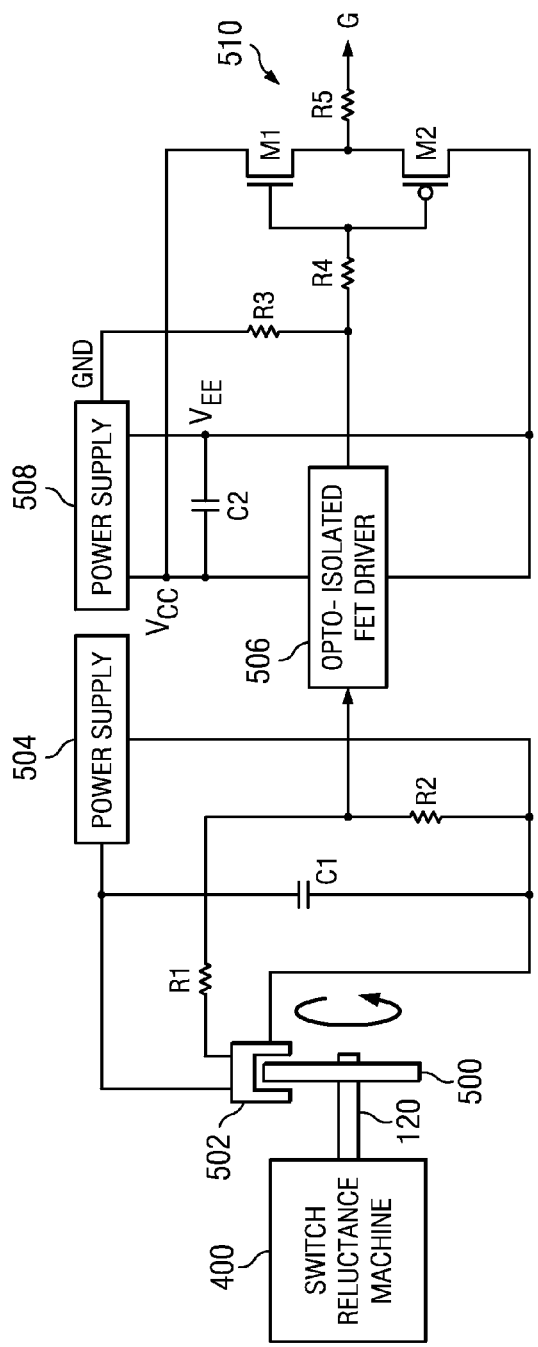
FIG. 13 illustrates a schematic diagram of an angular position sensor and drive control circuit used in FIGS. 8 and 12.

Reference is now made to FIG. 13 which illustrates a schematic diagram of an angular position sensor 218 and drive control circuit 216 used in FIGS. 8 and 12. One circuit as shown in FIG. 13 is needed for each machine included in the stack of FIGS. 11A and 11B. The angular position sensor utilizes a slotted wheel 500 is mounted to the shaft 120 of the switched reluctance machine. A fork-type optical sensor 502 is positioned to straddle the slotted wheel 500. An example of such a sensor is a Pepperl & Fuchs GL10-RT/32/40A/98A sensor. The sensor 502 is powered from a first voltage supply 504. A capacitor C1 is connected across the supply terminals of the first voltage supply 504. The output of the sensor 502 is applied to a voltage divider formed by resistors R1 and R2 connected in series. An output of the voltage divider is applied to the input of an opto-isolated FET driver circuit 506. An example of such a driver circuit 506 is an Avago ACNW3190 integrated circuit. The driver circuit 506 is powered from a second voltage supply 508. A capacitor C2 is connected across the Vcc and Vee supply terminals of the second voltage supply 508. The supply 508 further provides a ground terminal. The output of the opto-isolated FET driver circuit 506 is applied through a resistor network R3 and R4 to the common gate terminals of a push-pull FET driver circuit 510. The circuit 510 includes an n-channel FET M1 connected in series with a p-channel FET M2 between the Vcc and Vee supply terminals of the second voltage supply 508. The output of the push-pull FET driver circuit 510 (taken at the connected source terminals of FETs M1 and M2) is applied through resistor R5 to gate terminal (G) of the switching transistor 212 (FIGS. 8 and 12).

In operation, the fork-type optical sensor 502 detects the presence of a slot in the rotating slotted wheel 500. That detection is supplied to the input of the opto-isolated FET driver circuit 506 providing signal isolation and generating at its output a corresponding detect signal. The detect signal turns on transistor M1 of the push-pull FET driver circuit 510 (transistor M2 is off) and a gate drive signal is generated which turns on the switching transistor 212 (FIGS. 8 and 12). When the slot in the rotating slotted wheel 500 is no longer detected by the fork-type optical sensor 502, this detection is signal isolated through the opto-isolated FET driver circuit 506 which generates a corresponding no-detect signal. Responsive to the no-detect signal, transistor M2 of the push-pull FET driver circuit 510 is turned on (transistor M1 is off) and a gate drive signal is generated which turns off the switching transistor 212 (FIGS. 8 and 12).

Reference is once again made to FIGS. 8 and 12. The switching transistor 212 must be a high voltage and high current device. Indeed, for the large currents present when the switching transistor 212 is turned on, it may be preferable for the switching transistor 212 to be implemented as a plurality of parallel connected transistor devices, where current is divided between the included devices. Accordingly, it will be recognized that switching transistor 212 as illustrated represents one or more actual transistor devices. Nonetheless, the switching transistor 212, in handling high current and high voltage, will generate a significant amount of heat. It is critical that this generated heat be dissipated.

Figure 14:
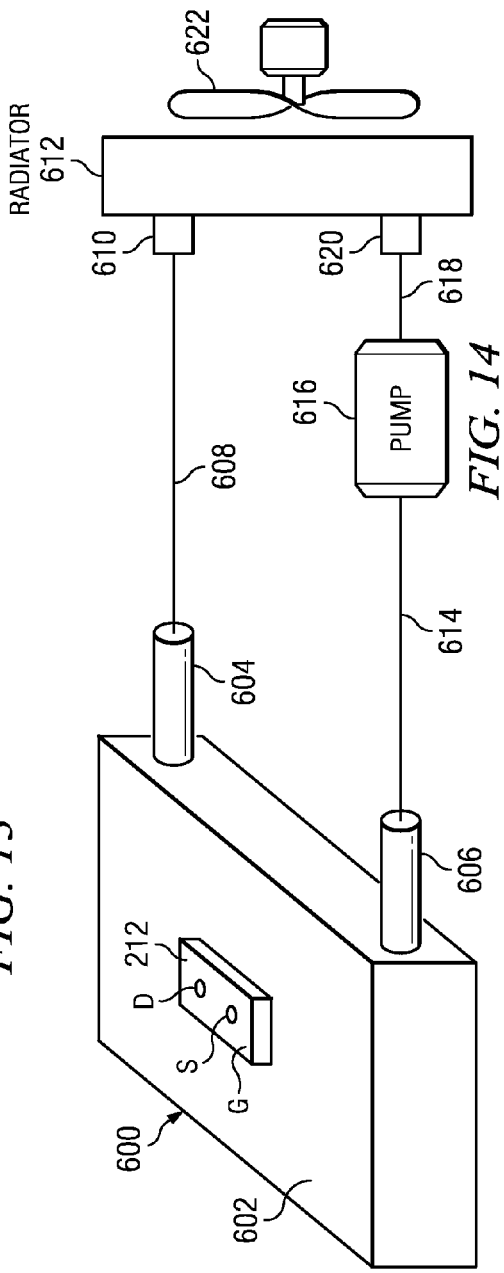
FIG. 14 illustrates a heat dissipation configuration.

Referring now to FIG. 14, there is illustrated a heat dissipation configuration for the switching transistor 212. A thermally conductive box structure 600 with an open (and perhaps baffled) interior is provided. Attached to one side 602 of the box structure 600 is the switching transistor 212. Of course, if multiple devices are required for implementing the switching transistor 212, there will be multiple devices attached to the side 602 of the box structure 600. The illustration of single device in FIG. 14 is exemplary only. The box structure 600 includes two ports 604 and 606. The port 604 is coupled 608 to a first port 610 of a radiator 612. The radiator 612 may be of any known design including, for example, radiators of the type conventionally used in automobiles. The port 606 is coupled 614 to one side of a fluid pump 616. The other side of the fluid pump 616 is coupled 618 to a second port 620 of the radiator 612. The radiator 612 may include a fan 622 for circulating air across the fins of the radiator. The box structure 600, coupling lines, and radiator 612 are filled with an appropriate coolant. This coolant may be any suitable coolant fluid. In a preferred embodiment the coolant fluid is polyethylene glycol.

Reference is now made to FIG. 15 which illustrates use of the switched reluctance machine SRM as described herein as the power plant for an electric vehicle application. The switched reluctance machine SRM as described herein may be used in place of an internal combustion engine in an automobile. The shaft 120 of the switched reluctance machine SRM is coupled, for example, to a conventional automobile transmission which drives one or more axles of the vehicle. Although illustrated in FIG. 15 in a rear-wheel drive configuration, it will be understood that the switched reluctance machine SRM could be used in other driver configurations including front wheel drive and all-wheel drive. Power for switched reluctance machine SRM operation is supplied from a battery bank. The battery bank may utilize any type of batteries. Lead acid batteries comprise one option for use in the battery bank. Another option is to use lithium-based batteries. Nicad batteries may also be used. Advantageously, the implementation may utilize the existing radiator for the vehicle (see, FIG. 14). Thus, the switched reluctance machine SRM could be configured with shaft 120 mating to a conventional automobile transmission and the switched reluctance machine SRM simply being swapped in place of the internal combustion engine. This would allow a legacy vehicle designed for an internal combustion engine power plant to be retrofitted into an electric vehicle application using the switched reluctance machine SRM power plant.

FIG. 16 illustrates an alternative implementation. In this implementation, a separate switched reluctance machine SRM is provided for each wheel of the vehicle (either 2 wheel drive or 4 wheel drive). The driver circuitry would be connected to actuate each switched reluctance machine SRM (where each SRM may include one or more stacks with M>=1). The switched reluctance machine SRM may, for example, directly drive its associated wheel. Alternatively, a gearing and/or transmission system may be implemented between the switched reluctance machine SRM and its associated wheel. In this implementation, it may further be advantageous to implement the switched reluctance machine SRM with the stator inside the rotor. In other words, the stator would be located in the center of the machine and the rotor would be positioned around and rotate about the stator. This implementation would then permit the rotor to be configured as a structural component of the wheel of the vehicle.

The preferred switched reluctance machine SRM for use in an automobile application like that of FIG. 15 would comprise one of the stacked implementation shown in FIGS. 11A and 11B. A switched reluctance machine SRM of this type configured as a motor has been built and tested for use in an electric vehicle application. The motor has M=3 machines 4000, each machine having N=6 stator poles, N*=6 rotor poles, a stator diameter of 6-18 inches, a rotor diameter of 2-12 inches, a rotor pole length of 2-6 inches, a PSP length of 0.5-3 inches, an ASP length of 0.25-2 inches, and a pole width of 0.75-3 inches. The motor, when configured with a stator diameter of 14-18 inches, a rotor diameter of 9-12 inches, a rotor pole length of 4 inches, a PSP length of 2 inches, an ASP length of 1.5 inches, and a pole width of 2 inches and tested with a battery bank of sixteen 6V lead acid batteries (a total of about 100 volts), produced a maximum speed of 2200 rpm, a maximum torque of 60 ft.-lbs. and a maximum power consumption of 18 K-watts. With this output, the switched reluctance machine SRM is an acceptable power plant replacement for many four and six cylinder internal combustion engines.

Other applications may utilize single stack or double stack switched reluctance machine SRM configurations (a single stack configuration being illustrated in FIG. 10). A switched reluctance machine SRM with a larger stack (i.e., M>3) may also be used for heavier duty (larger torque and power) applications provided sufficient space is available for the installation.

Although the embodiments illustrated and described herein relate to a reluctance machine where the rotor is inside the stator, it will be understood that the disclosed reluctance machine could alternatively be configured with the stator inside the rotor.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An electric vehicle, comprising:
   at least one drive wheel; and
   a power plant configured to supply torque for causing rotation of the at least one drive wheel, wherein the power plant comprises a switched reluctance motor, the switched reluctance motor comprising:
   a stator having a plurality of stator poles;
   a rotor having a plurality of rotor poles, the rotor being coupled to the at least one drive wheel;
   wherein each stator pole comprises:
      a primary stator pole having a primary stator winding; and
      an auxiliary stator pole having an auxiliary stator winding;
   a circuit configured to actuate the primary stator pole and auxiliary stator pole in a stator energizing phase comprising a primary energizing phase in which a first current is switched to flow from a power supply node through the primary stator winding and an auxiliary energizing phase in which a second current generated by the primary stator winding is switched to flow from the primary stator winding to the auxiliary stator winding.

2. The vehicle of claim 1 wherein each stator pole comprises the auxiliary stator pole in axial alignment with the primary stator pole in the direction of an axis of rotation of the rotor, and wherein the rotor pole has a length extending in the direction of the axis of rotation sufficient to at least partially cover both the primary stator pole and the axially aligned auxiliary stator pole during the stator energizing phase.

3. The vehicle of claim 2 wherein axial alignment comprises the auxiliary stator pole and primary stator pole being oriented at a same angular position with respect to each other.

4. The vehicle of claim 1 wherein each rotor pole supports an axial magnetic flux path extending between the primary stator pole and the auxiliary stator pole during the stator energizing phase.

5. The vehicle of claim 1 wherein the primary energizing phase terminates and the auxiliary energizing phase starts at a point of rotor rotation prior to where a minimized reluctance between the rotor pole and stator pole is reached.

6. The vehicle of claim 1 wherein the second current generated by the primary stator winding comprises an inductive pulse produced from magnetic energy stored in the primary stator winding during the primary energizing phase.

7. The vehicle of claim 1 wherein the primary stator windings are electrically connected such that circumferentially adjacent primary stator poles have opposite winding directions; and wherein the auxiliary stator windings are electrically connected such that circumferentially adjacent auxiliary stator poles have opposite winding directions.

8. The vehicle of claim 1 wherein the circuit configured to actuate comprises a switching transistor having a control terminal and a first conduction terminal, the primary stator winding being coupled between the power supply node and the first conduction terminal and the auxiliary stator winding being coupled between the power supply node and the first conduction terminal, and further comprising a diode coupled in series with the auxiliary stator winding and oriented to block current flow from the power supply node through the auxiliary stator winding.

9. The vehicle of claim 8 wherein the circuit further comprises a snubber diode coupled in series with the first conduction terminal of the switching transistor.

10. An electric vehicle, comprising:
at least one drive wheel; and
a power plant configured to supply torque for causing rotation of the at least one drive wheel, wherein the power plant comprises a switched reluctance motor, the switched reluctance motor comprising:
a stator having a plurality of stator poles;
a rotor having a plurality of rotor poles, the rotor being coupled to the at least one drive wheel;
wherein each stator pole comprises:
a primary stator pole having a primary stator winding coupled between a first power supply node and an intermediate node; and
an auxiliary stator pole having an auxiliary stator winding also coupled between the first power supply node and the intermediate node;
wherein the primary stator pole and the auxiliary stator pole are axially aligned with each other in the direction of an axis of rotation of the rotor;
a circuit configured to actuate the primary stator pole and auxiliary stator pole comprising a switching transistor having a conduction terminal coupled between the intermediate node and a second power supply node to actuate all of the stator poles in a single stator energizing phase.

11. The vehicle of claim 10 wherein the rotor pole has a length extending in the direction of the axis of rotation sufficient to at least partially cover both the primary stator pole and the axially aligned auxiliary stator pole during the single stator energizing phase.

12. The vehicle of claim 11 wherein axial alignment comprises the auxiliary stator pole and primary stator pole being oriented at a same angular position with respect to each other.

13. The vehicle of claim 10 wherein each rotor pole supports an axial magnetic flux path extending between the primary stator pole and the auxiliary stator pole during the single stator energizing phase.

14. The vehicle of claim 10 wherein the single stator energizing phase comprises a primary energizing phase in which actuation of the switching transistor causes a first current to flow from the first power supply node through the primary stator winding and an auxiliary energizing phase in which deactivation of the switching transistor causes a second current generated by the primary stator winding to flow from the primary stator winding to the auxiliary stator winding.

15. The vehicle of claim 14 wherein the primary energizing phase terminates and the auxiliary energizing phase starts at a point of rotor rotation prior to where a minimized reluctance between the rotor pole and stator pole is reached.

16. An electric vehicle, comprising:
at least one drive wheel; and
a power plant configured to supply torque for causing rotation of the at least one drive wheel, wherein the power plant comprises a switched reluctance motor, the switched reluctance motor comprising:
a single energizing phase stator having a plurality of stator poles;
a rotor having a plurality of rotor poles, the rotor being coupled to the at least one drive wheel;
wherein each stator pole comprises:
a primary stator pole having a primary stator winding; and
an auxiliary stator pole having an auxiliary stator winding, wherein the primary stator pole and the auxiliary stator pole are aligned with each other in the direction of an axis of rotation of the rotor to apply a magnetic attraction force to the rotor during said single stator energizing phase, each rotor pole having a length extending in the direction of an axis of rotation for said rotor sufficient to at least partially cover both the primary stator pole and the axially aligned auxiliary stator pole during the single stator energizing phase;
a circuit configured to simultaneously actuate the plurality of stator poles in the single energizing phase, wherein during the single stator energizing phase the primary stator windings of the primary stator poles are initially actuated followed by actuation of the auxiliary stator windings of the auxiliary stator poles.

17. The vehicle of claim 16 wherein each rotor pole supports an axial magnetic flux path extending between the primary stator pole and the auxiliary stator pole that are actuated during the single stator energizing phase.

18. The vehicle of claim 16 wherein the single stator energizing phase comprises a primary energizing phase in which a first current is switched by the circuit to flow through the primary stator winding followed by an auxiliary energizing phase in which a second current generated by the primary stator winding is switched by the circuit to flow from the primary stator winding to the auxiliary stator winding.

19. The vehicle of claim 18 wherein the second current generated by the primary stator winding comprises an inductive pulse produced from magnetic energy stored in the primary stator winding during the primary energizing phase.

20. The vehicle of claim 16 wherein the initial actuation of the primary stator winding terminates and the following actuation of the auxiliary stator windings starts at a point of rotor rotation prior to where a minimized reluctance between the rotor pole and stator pole is reached.

* * * * *